(12) United States Patent
Shirogane et al.

(10) Patent No.: US 7,240,167 B2
(45) Date of Patent: Jul. 3, 2007

(54) STORAGE APPARATUS

(75) Inventors: Tetsuya Shirogane, Yokohama (JP);
Naoto Matsunami, Hayamamachi (JP)

(73) Assignee: Hitachi, Ltd., Tokyo (JP)

( * ) Notice: Subject to any disclaimer, the term of this patent is extended or adjusted under 35 U.S.C. 154(b) by 190 days.

(21) Appl. No.: 10/882,366

(22) Filed: Jul. 2, 2004

(65) Prior Publication Data
US 2005/0240738 A1 Oct. 27, 2005

(30) Foreign Application Priority Data
Apr. 26, 2004 (JP) ............................. 2004-129340

(51) Int. Cl.
*G06F 12/00* (2006.01)
(52) U.S. Cl. ...................... 711/148; 711/152
(58) Field of Classification Search ..................... None
See application file for complete search history.

(56) References Cited

U.S. PATENT DOCUMENTS

| | | | |
|---|---|---|---|
| 5,649,102 A | | 7/1997 | Yamauchi et al. |
| 5,956,712 A | * | 9/1999 | Bennett et al. ............. 707/8 |
| 5,999,930 A | | 12/1999 | Wolff |
| 6,389,420 B1 | * | 5/2002 | Vahalia et al. ............. 707/8 |
| 6,560,601 B1 | | 5/2003 | Bjornerstedt |
| 6,633,870 B1 | | 10/2003 | Bradley |
| 6,671,757 B1 | | 12/2003 | Multer et al. |
| 2004/0220979 A1 | | 11/2004 | Young et al. |

FOREIGN PATENT DOCUMENTS

JP 2003-131917 5/2003

* cited by examiner

*Primary Examiner*—Reginald Bragdon
*Assistant Examiner*—Thanh D. Vo
(74) *Attorney, Agent, or Firm*—Antonelli, Terry, Stout & Kraus, LLP.

(57) ABSTRACT

When a storage apparatus receives a write request for a storage area in LU0, an owner access processing unit judges whether write processing for the storage area is restricted with reference to a lock information table. When it is restricted, the owner access processing unit does not perform write processing for the storage area, and, if it is not restricted, the owner access processing unit sets a write processing restriction in a column of the storage area of the lock information table and performs write processing for the storage area. If other storage apparatuses receive the write request for the same area, the owner access processing unit transmits the lock reservation request to restrict write processing for the area of the LU, and if they receive acceptance of the lock reservation request from this storage apparatus, the owner access processing unit performs write processing for the storage area.

6 Claims, 18 Drawing Sheets

| LU | OWNER |
|----|-------|
| 0  | A     |
| 1  | B     |
| 2  | C     |

117

DLH: DATA LINK HEADER
IPH: IP HEADER
TCH: TCP HEADER
BHS: BASIC HEADER SEGMENT
DLT: DATA LINK TRAILER

FIG. 13

| BYTE | 0 BYTE | | 1 BYTE | 2 BYTE | 3 BYTE | |
|---|---|---|---|---|---|---|
| | .\|I\| OP CODE | F | OP CODE-SPECIFIC FIELD | | | 410, 411 |
| 0 | | | | | | |
| 4 | TOTAL AHS LENGTH | | DATA SEGMENT LENGTH | | | 412 |
| 8–12 | LUN OR OP CODE SPECIFIC FIELD | | | | | 413 |
| 16 | INITIATOR TASK TAG | | | | | |
| 20–44 | OP CODE SPECIFIC FIELD | | | | | 414 |
| 48 | DATA SEGMENT FIELD | | | | | 415 |

STORAGE APPARATUS

CROSS-REFERENCES TO RELATED APPLICATIONS

This application relates to and claims priority from Japanese Patent Application No. 2004-129340, filed on Apr. 26, 2004, the entire disclosure of which is incorporated herein by reference.

BACKGROUND OF THE INVENTION

The present invention relates to a storage apparatus for commoditizing data to be stored in a storage device by transmitting and receiving this data to and from other storage apparatus; a storage system provided with this device; a data management method for operation of this system; and a controller execution program for control of the storage apparatus.

A storage apparatus is generally a single hard disk device or a disk array device for controlling a collection of plural hard disk devices by use of a control unit.

In recent years, iSCSI (internet SCSI), which is a protocol technology for realizing a SCSI process as a higher protocol on a TCP (Transmission Control Protocol)/IP, which is a network protocol, has been noted as a storage interface (hereinafter, abbreviated as I/F). According to the iSCSI, long-distance communication is available by using an IP network, and the iSCSI has a characteristic such that its application is cheaper than that of a FC (Fibre Channel) that has been conventionally used.

Therefore, when the iSCSI is used for communication between a host and a storage apparatus, a data sharing system can be constructed at a low price. For example, as this sort of technology, there is a known technology in which replication of the data of a storage apparatus A allocated at a branch A in a certain city is held in a storage apparatus B allocated at a branch B in another city so as to synchronize the data periodically. In addition, JP-A-2003-131917 discloses a method which is used to manage a difference in order to rapidly realize coincidence of remote copy data between remaining sites after an arbitrary site is struck among the storage apparatuses arranged at N sites (not less than three sites).

SUMMARY OF THE INVENTION

However, according to conventional technology, for example, after performing write processing at a site A, when another site B also performs write processing with respect to other data, the data stored in the storage apparatus of the site A does not correspond with the data stored in the storage apparatus of the site B, and this creates a problem in that a consistency of the data between respective sites is not maintained.

The present invention has been made while taking the foregoing problems into consideration and provides a technique that is capable of maintaining consistency of data between respective sites.

In order to attain the above-described object, the invention provides a method of data management for a storage system, wherein the storage system intends to commoditize data to be stored in a storage device of each storage apparatus by transmitting and receiving the data to be stored in the storage device mutually between a plurality of storage apparatuses, each of which is provided with a storage device. In the data management method, when an access request is issued to any one of plural storage apparatuses, by referring to a lock information table in which lock information indicating whether or not access to storage areas in the storage device of the one storage apparatus should be restricted for each of the plural storage areas of the storage device of the one storage apparatus, the one storage apparatus judges whether or not access processing to the storage area indicated by the access request is restricted. When the access processing is restricted, the one storage apparatus does not perform access processing for the storage area; and, when the access processing is not restricted, the one storage apparatus sets an access restriction in a column of the storage area of the lock information table and performs "owner site access processing" to perform access processing for the storage area. When the access request is issued to another storage apparatus other than the one storage apparatus among the plural storage apparatuses, in the case where the storage area indicated by the access request to the other storage apparatus corresponds to the storage area indicated by the access request to the one storage apparatus, the other storage apparatus transmits a lock reservation request to restrict the access processing to the storage area; and, when receiving the information about acceptance of the lock reservation request from the one storage apparatus, it performs access processing for the storage area. When receiving information indicating rejection of the lock reservation request from the one storage apparatus, it performs "non-owner site access processing" and does not perform access processing for the storage area.

In this case, it is preferable according to the data management method of the present invention that each storage device of plural storage apparatuses has a plurality of storage area groups as a collection of plural storage areas. Each of the plural storage apparatuses is provided with a lock information table in which lock information indicating whether or not access to the storage area for each storage area of a storage area group to which the owner belongs, and an owner information table indicating which storage apparatus manages the access to each storage area group.

When receiving an access request, by referring to the owner information table, the plural storage apparatuses judge whether the access of the access request corresponds to a storage area included in which storage area group. If the access corresponds to the storage area included in the storage area group, of which access is managed by its own site, the plural storage apparatuses perform owner site access processing; and, if the access corresponds to a storage area included in the storage area group, of which access is managed by the storage apparatus of another site, the plural storage apparatuses perform non-owner site access processing.

In order to attain the above-described object, a data management method for a storage system is provided according to the present invention for a storage system which intends to commoditize data to be stored in a storage device of each storage apparatus by transmitting and receiving the data to be stored in the storage device mutually between a plurality of storage apparatuses, each of which is provided with a storage device. In the data management method, when an access request is issued to any one of the plural storage apparatuses, one storage apparatus transmits a lock reservation request to restrict the access processing for the storage area corresponding to the storage area that is indicated by the access request to any one other storage apparatus other than the one storage among the plural storage apparatuses. When information about acceptance of a lock reservation request is received from the one storage apparatus, the one storage apparatus performs access processing for the storage area; and, when information about rejection of the lock reservation request is received from the one storage apparatus, the non-owner site access processing not performing the access processing for the storage area. Upon receiving the access request, when the storage area that is indicated by the access request corresponds to the storage area that is indicated by the access request to the other storage apparatus, with reference to a lock information table in which the lock information indicating whether or not the access to the storage area should be restricted for each of plural storage areas of the storage device of the other storage apparatus, the other storage apparatus judges whether or not the access to the storage area that is indicated by the access request should be restricted. If the access is restricted, the access processing for the storage area is not performed; and, if the access is not restricted, access restriction is set in a column of the storage area of the lock information table and the owner site access processing is performed to make access to the storage area.

In addition, for each embodiment according to the above-described data management method, in the non-owner site access processing, it is preferable that after performing access to a storage area that is indicated by an access request, a lock release request to release the access restriction for the storage area is transmitted to the storage apparatus for performing the owner site access processing.

Further, for each embodiment according to the above-described data management method, in the owner site access processing and the non-owner site access processing, it is preferable that, when the received access request is a write request and write processing is to be carried out for the storage area indicated by the write request, a computer for performing the owner site access processing or the non-owner site access processing performs remote copy processing to transmit the write data with respect to the write request for all other storage apparatuses other than the storage apparatus performing write processing for the write request.

In order to attain the above-described object, the first embodiment of a storage system may constitute a storage system that intends to commoditize data to be stored in a storage device of each storage apparatus by transmitting and receiving data to be stored in the storage device mutually between a plurality of storage apparatuses, each of which is provided with a storage device. The storage apparatus comprises a host side communication part for engaging in communication with the outside; a storage side communication part for engaging in communication with other storage apparatuses; a lock information table for storing lock information indicating whether or not the write processing for the storage area is restricted for each of plural storage areas of the storage device therein; and a controller for controlling the communication of the host side communication part and the storage side communication part, and, with reference to the lock information table, performing the access processing for the storage device. The controller performs a lock reservation request receiving step for receiving a lock reservation request to restrict the write processing for any storage area among the plural storage areas from the other storage apparatus by means of the storage side communication part; and a lock reservation request processing step, upon receiving the lock reservation request in the lock reservation request receiving step, of judging whether or not the write processing for the storage area indicated by the lock reservation request is restricted with reference to the lock information table; transmitting a rejection of the lock reservation to the other storage apparatus by means of the storage side communication part when the write processing is restricted and setting the write processing restriction in the column of the storage area of the lock information table when the write processing is not restricted; and transmitting an acceptance of the lock reservation to the other storage apparatus by means of the storage side communication part.

In this case, it is preferable that the controller further performs an access request receiving step for receiving the write request to any one of the plural storage areas from the outside by means of the host side communication part; and an owner access processing step, upon receiving the write request in the access request receiving step, of judging whether or not the write processing for the storage area indicated by the write request is restricted with reference to the lock information table; not performing the write processing for the storage area when the write processing is restricted; and setting the write processing restriction in the column of the storage area of the lock information table and performing the write processing for the storage area when the write processing is not restricted.

Further, it is preferable that the controller performs a remote copy processing step for transmitting write data with respect to a write request to all other storage apparatuses by means of the storage side communication part when performing write processing for the storage area that is indicated by the write request in the owner access processing step.

In addition, for each embodiment of the above-described storage apparatus, it is preferable that the storage device has another storage area group serving as a collection of plural storage areas other than the storage area group serving as a collection of plural storage areas managed by the lock information table; and the storage device is provided with an owner information table indicating by which storage apparatus a lock information table for each storage area group of the storage device is managed; wherein the controller performs an owner judgment processing step for judging that the write request received in the access request receiving step is for write processing for the storage area included in which storage area group with reference to the owner information table. If the write processing corresponds to the storage area included in the storage area group of the lock information table that is managed by its own site, the owner access processing step is performed; and if the write processing corresponds to the storage area included in the storage area group of the lock information table that is managed by other storage apparatus, the storage apparatus side communication part transmits the lock reservation request to restrict the write request for the storage area included in the storage area group to the other storage apparatus managing the lock information of the storage apparatus side communication part. There is a non-owner access processing step for performing the write processing for the storage area that is indicated by the write request when the storage side communication part receives acceptance of the lock reservation for the lock reservation request after transmitting the lock reservation request in the owner judgment processing step; and a lock release request transmitting step for making the storage apparatus side communication part transmit the lock release request to release the access restriction for the storage area to the other storage apparatus after performing the write processing for the storage area in the non-owner access processing step.

In this case, it is preferable that the controller performs a remote copy processing step for transmitting write data with respect to the write request to all other storage apparatuses by means of the storage side communication part when performing the write processing for the storage area that is indicated by the write request in the non-owner access processing step.

In order to attain the above-described object, the second embodiment of a storage system intends to commoditize data to be stored in a storage device of each storage apparatus by transmitting and receiving the data to be stored in the storage device mutually between a plurality of storage apparatuses, each of which is provided with a storage device. The storage apparatus comprises a host side communication part for engaging in communication with the outside; a storage side communication part for engaging in communication with other storage apparatuses; a lock information table for storing the lock information indicating whether or not the write processing for the storage area is restricted for each of plural storage areas of the storage device therein; and a controller for controlling the communication of the host side communication part and the storage side communication part and with reference to the lock information table, performing access processing for the storage device. The controller performs an access request receiving step for receiving the write request for any one of the plural storage areas from the outside by means of the host side communication part; a lock reservation request transmitting step for transmitting a lock reservation request to restrict the write processing for the storage area that is indicated by the write request to the other storage apparatus by means of the storage apparatus side communication part; a non-owner access processing step for performing the write processing for the storage area that is indicated by the write request when the storage side communication part receives acceptance of the lock reservation for the lock reservation request from the other storage apparatus after transmitting the lock reservation request in the owner judgment processing step; and a lock release request transmitting step for making the storage apparatus side communication part to transmit the lock release request to release the write processing restriction for the storage area to the other storage apparatus after performing the write processing for the storage area in the non-owner access processing step.

In order to attain the above-described objects, the storage system includes a storage apparatus according to the first embodiment (hereinafter, referred to as an owner storage apparatus); and a storage apparatus according to the second embodiment capable of communicating with the foregoing owner storage apparatus (hereinafter, referred to as a non-owner storage apparatus). Here, the non-owner storage apparatus is defined as the other storage apparatus with respect to the owner storage apparatus, and the owner storage apparatus is defined as the other storage apparatus with respect to the non-owner storage apparatus.

In order to attain the above-described object, the controller execution program of a storage apparatus may involve a storage device; a host side communication part for engaging communication with the outside; a storage side communication part for engaging communication with other storage apparatus; and a controller for controlling the communication of the host side communication part and the storage side communication part and performing the access processing for the storage device, wherein the program intends to commoditize data to be stored in the storage device by transmitting and receiving the data to be stored in the storage device to and from other storage apparatuses. The controller performs a lock reservation request receiving step for receiving the lock reservation request to restrict the write processing for any storage area among the plural storage areas from the other storage apparatus by means of the storage side communication part; and a lock reservation request processing step, upon receiving the lock reservation request in the lock reservation request receiving step, judging whether or not the write processing for the storage area indicated by the lock reservation request is restricted with reference to the lock information table for storing the lock information indicating whether or not the write processing for the storage area is restricted for each of plural storage areas of the storage device therein; transmitting rejection of the lock reservation to the other storage apparatus by means of the storage side communication part when the write processing is restricted and setting the write processing restriction in the column of the storage area of the lock information table when the write processing is not restricted; and transmitting acceptance of the lock reservation to the other storage apparatus by means of the storage side communication part.

In this case, according to the controller execution program, it is preferable that the controller further performs an access request receiving step for receiving the write request to any one of the plural storage areas from the outside by means of the host side communication part; and an owner access processing step, upon receiving the write request in the access request receiving step, judging whether or not the write processing for the storage area indicated by the write request is restricted with reference to the lock information table; not performing the write processing for the storage area when the write processing is restricted; and setting the write processing restriction in the column of the storage area of the lock information table and performing the write processing for the storage area when the write processing is not restricted.

In addition, according to the controller execution program, it is preferable that the controller performs a remote copy processing step for transmitting the write data with respect to the write request to all other storage apparatuses by means of the storage side communication part when performing the write processing for the storage area that is indicated by the write request in the owner access processing step.

In addition, according to the above-described controller execution program, it is preferable that the storage device has another storage area group as a collection of plural storage areas other than the storage area group as a collection of plural storage areas managed by the lock information table; and the storage device is provided with an owner information table indicating by which storage apparatus a lock information table for each storage area group of the storage device is managed; wherein the controller performs an owner judgment processing step for judging the write request received in the access request receiving step is the write processing for the storage area included in which storage area group with reference to the owner information table; if the write processing corresponds to the storage area included in the storage area group of the lock information table that is managed by its own site, performing the owner access processing step; and if the write processing corresponds to the storage area included in the storage area group of the lock information table that is managed by other storage apparatus, making the storage apparatus side communication part to transmit the lock reservation request to restrict the write request for the storage area included in the storage area group to the other storage apparatus managing the lock information of the storage apparatus side communication part; a non-owner access processing step for performing the write processing for the storage area that is indicated by the write request when the storage side communication part receives acceptance of the lock reservation for the lock reservation request after transmitting the lock reservation request in the owner judgment processing step; and a lock release request transmitting step for making the storage apparatus side communication part to transmit the lock release request to release the access restriction for the storage area to the other storage apparatus after performing the write processing for the storage area in the non-owner access processing step.

In this case, for the controller execution program, it is preferable that the controller performs a remote copy processing step for transmitting the write data with respect to the write request to all other storage apparatuses by means of the storage side communication part when performing the write processing for the storage area that is indicated by the write request in the non-owner access processing step.

In order to attain the above-described object, a controller execution program of a storage apparatus may involve a storage device; a host side communication part for engaging communication with the outside; a storage side communication part for engaging communication with other storage apparatus; and a controller for controlling the communication of the host side communication part and the storage side communication part and performing the access processing for the storage device, wherein the program intends to commoditize data to be stored in the storage device by transmitting and receiving the data to be stored in the storage device to and from other storage apparatuses. The controller performs an access request receiving step for receiving the write request for any one of the plural storage areas of the storage device from the outside by means of the host side communication part; a lock reservation request transmitting step for transmitting a lock reservation request to restrict the write processing for the storage area that is indicated by the write request to the other storage apparatus by means of the storage apparatus side communication part; a non-owner access processing step for performing the write processing for the storage area that is indicated by the write request when the storage side communication part receives acceptance of the lock reservation for the lock reservation request from the other storage apparatus after transmitting the lock reservation request in the owner judgment processing step; and a lock release request transmitting step for making the storage apparatus side communication part to transmit the lock release request to release the write processing restriction for the storage area to the other storage apparatus after performing the write processing for the storage area in the non-owner access processing step.

In this case, according to the controller execution program, it is preferable that the controller performs a remote copy processing step for transmitting the write data with respect to the write request to all other storage apparatuses by means of the storage side communication part when performing write processing for the storage area that is indicated by the write request in the non-owner access processing step.

According to the present invention, when one storage apparatus among a plurality of storage apparatuses is performing access processing including the write processing, the access processing including the write processing of the other storage apparatus is restricted, so that it is possible to maintain consistency of the data between respective sites with each other.

BRIEF DESCRIPTION OF THE DRAWINGS

FIG. 13 is a diagram showing an example of the format within the iSCSI PDU;

DESCRIPTION OF THE EMBODIMENTS

Various embodiments of a storage system according to the present invention will be described below.

A First Embodiment

At first, with reference to FIGS. 1 to 17, the storage system according to a first embodiment of the present invention will be described.

Figure 1:
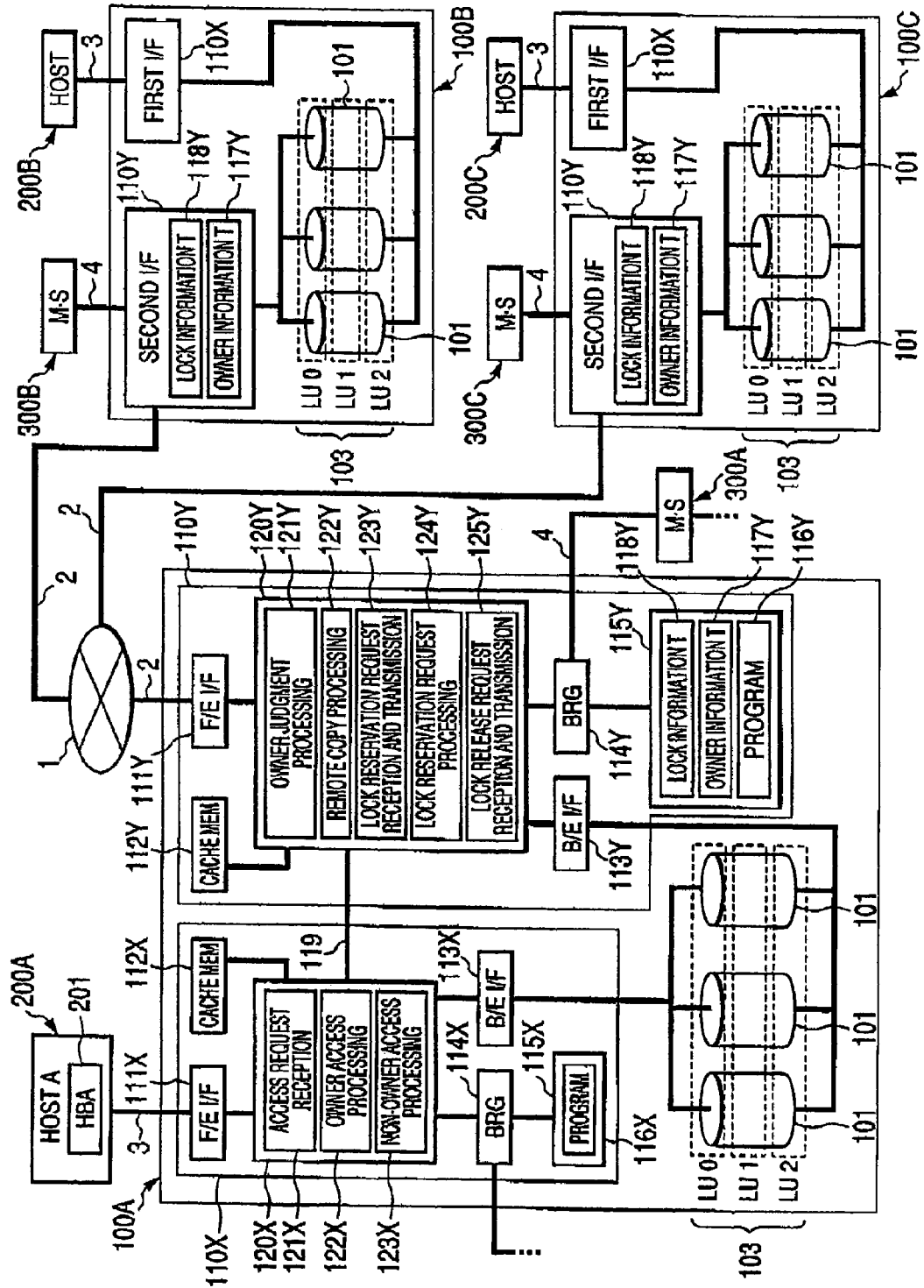
FIG. 1 is a block diagram showing an example of a storage system according to a first embodiment of the present invention.

As shown in FIG. 1, the storage system according to the present embodiment is provided with a plurality of storage apparatuses 100A, 100B and 100C that are connected to an IP (Internet Protocol) network 1 through a Gigabit Ethernet (Ethernet is a registered trade mark of Xerox Corporation (U.S.A.)) 2; hosts 200A, 200B and 200C that are connected to respective storage apparatuses 100A, 100B and 100C through a FC (Fibre channel) link 3, respectively; and management servers 300A, 300B and 300C that are connected to respective storage apparatuses 100A, 100B and 100C through a LAN (Local Area Network) 4, respectively.

Respective storage apparatuses 100A, 100B and 100C are provided with a plurality of disk devices 101; a first interface 110X communicating with a corresponding host 200 and performing access processing to the plural disk devices 101; and a second interface 110Y for communicating with the other storage apparatuses 100 through the IP network 1 and performing access processing to the plural disk devices 101.

Figures 3, 4:
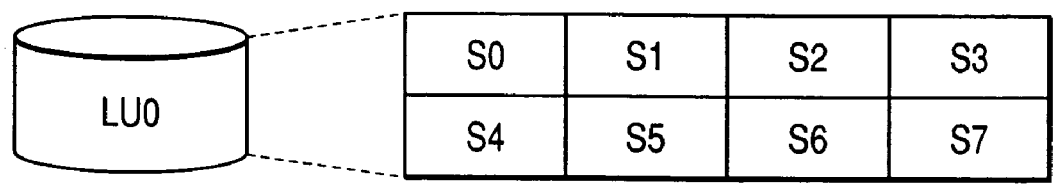
FIG. 3 is a diagram showing an example of an owner information table according to the first embodiment of the present invention.
FIG. 4 is a block diagram showing an example of a LU according to the first embodiment of the present invention.

A storage area of the plural disk devices 101 is divided into an LU (Logical Unit) 0, an LU 1, an LU 2, ..., in which the data image from the host 200 is made into one storage area group. As shown in FIG. 4, each of LU0, LU1, LU2, ... is further divided into plural storage areas S0 to S7. In other words, a collection of plural storage areas S0 to S7 configures the LU as one storage area group. In the meantime, a unit of the storage area is a track (an address unit of 64 KB) in this case.

Both the first I/F 110X and the second I/F 110Y have front ends I/F 111X, 111Y; cache memories 112X, 112Y; controllers 120X, 120Y; back ends I/F 113X, 113Y; bridges 114X, 114Y; and control memories 115X, 115Y.

The frontend I/F 111X of the first I/F 110X may perform input and output processing of the data of a FC protocol so as to establish FC protocol communication with the corresponding host 200. In this FC protocol communication, the frontend I/F 111X may transmit and receive an upper layer SCSI command of the FC protocol. The frontend I/F 111Y of the second I/F 110Y may perform input and output processing of the data of an IP protocol so as to establish IP protocol communication with the other storage apparatus 100. In this IP protocol communication, the frontend I/F 111Y may transmit and receive an upper layer SCSI command of the IP protocol. The backend I/F 113X and 113Y of the first and second I/F 110X and 110Y cause any one from among the plural disk devices 101 to perform access processing in accordance with an instruction from the controllers 120X and 120Y. The cache memories 112X and 112Y serve as a cache to a request, such as a read request and a write request or the like that are received by the frontend I/F 111X and 111Y. For example, when the frontend I/F 111X and 111Y receive a write request, this write request is stored in the cache memories 112X and 112Y at first, and then this write request is stored in any one of the plural disk devices 101. In addition, when the frontends I/F 111X and 111Y receive a read request, the corresponding data is read from any one of the plural disk devices 101, this data is stored in the cache memories 112X and 112Y at first, and then this data is transmitted to a read request source. In addition, receiving the write request from the host 200, the first I/F 110X stores the data transmitted from the host 200 in the cache memory 112X and, further, the first I/F 110X also passes the same data to the second I/F 120Y through the controller 120X and a communication path 119. The controller 120Y of the second I/F 120Y may write this into the cache memory 112Y. Therefore, even if the data stored in the cache memory 112X is unavailable due to the occurrence of a failure in the first I/F 110X, the data can be retrieved from the cache memory 112Y and sent to the disk device 101.

The bridges 114X and 114Y are connected to a corresponding management server 300. The management server 300 may change the setting of programs and the data within the control memories 115X and 115Y through the LAN 4 and the bridges 114X and 114Y.

In the control memory 115X of the first I/F 110X, a program 116X to be executed by the controller 120X is stored. In addition, in the control memory 115Y of the second I/F 110Y, a program 116Y to be executed by the controller 120Y, an owner information table 117Y and a lock information table 118Y are stored. As will be described later, the owner information table 117Y may indicate which storage apparatus manages the access to which LU, and, also, as will be described later, the lock information table 118Y may store lock information indicating whether or not access to the storage area is restricted for each of plural storage areas within the LU, of which access is managed by the lock information table 118Y itself.

The controller 120X of the first I/F 110X has an access request reception unit 121X for receiving an access request from the corresponding host 200 through the frontend I/F 111X, an owner access processing unit 122X for processing an access request to the LU managed by the controller 120X itself, and a non-owner access processing unit 123X for processing an access request to the LU managed by another storage apparatus 100.

In addition, with reference to the owner information table 117Y, the second controller 120Y of the second I/F 110Y has an owner judgment processing unit 121Y for judging under which storage apparatus 100 the LU to be accessed by the access request that is received through the first I/F 110X is managed, a remote copy processing unit 122Y for processing the write request upon receiving this write request and the write data from another storage apparatus 100 while transmitting the write request and the write data to the other storage apparatus 100 for remote copy, a lock reservation request reception and transmission unit 123Y for receiving and transmitting a lock reservation request to restrict access to a specific storage area from and to the other storage apparatus 100, a lock reservation request processing unit 124Y for judging whether or not access of the storage area indicated by the lock reservation request from the other storage apparatus 100 is restricted, and a lock release request reception and transmission unit 125X for receiving and transmitting a lock release request from and to the other storage apparatus 100. In the meantime, each part of respective controller 120X and 120Y may function by executing the programs 116X and 116Y that are stored in the control memories 115X and 115Y.

The host 200 has an HBA (Host Bus Adapter) 201 that is an I/F capable of processing the FC protocol, and the host 200 is connected to the storage apparatus 100 through the FC link 3 by the HBA 201. In addition, this host 200 is a computer having a CPU and a memory or the like (not illustrated).

The first I/F 100X of the storage apparatus 100 serves as a target to the host 200 serving as an initiator, and the first I/F 100X makes access to a common (shared) storage image 103 to be allowed. In other words, upon receiving the read request and the write request that are transmitted from the host 200, the first I/F 100X may process the read request and the write request to a designated area of each LU configuring the common storage image 103.

The second I/F 110Y of the storage apparatus 100 serves as both an initiator and a target with respect to the second I/F 110Y of the other storage apparatus 100 via the IP network 1. In other words, when the second I/F 110Y transmits a read request and a write request to the designated area of each LU configuring the storage image 103 to the second I/F 110Y of the other storage apparatus 100 serving as an initiator and receives a read request and a write request from the second I/F 110Y of the other storage apparatus 100 serving as a target, the second I/F 110Y may process the read request and the write request to the designated area of each LU configuring the storage image 103.

Upon completion of the above-described initialization of the storage system, (1) at first, the second I/F 110Y log-on with each other, (2) then, the data of the lock information table 118Y and the common data image 103 are initialized, in other words, these data are made to have the same contents in the respective storage apparatuses 100A, 100B and 100C. For example, the storage apparatus 100A may copy the data of the lock information table 118Y and the common data image 103 into the storage apparatuses 100B and 100C via the second I/F 110Y. After that, (3) the second I/F 110Y may allow log-on from the host 200 and the continued access request.

Figure 2:
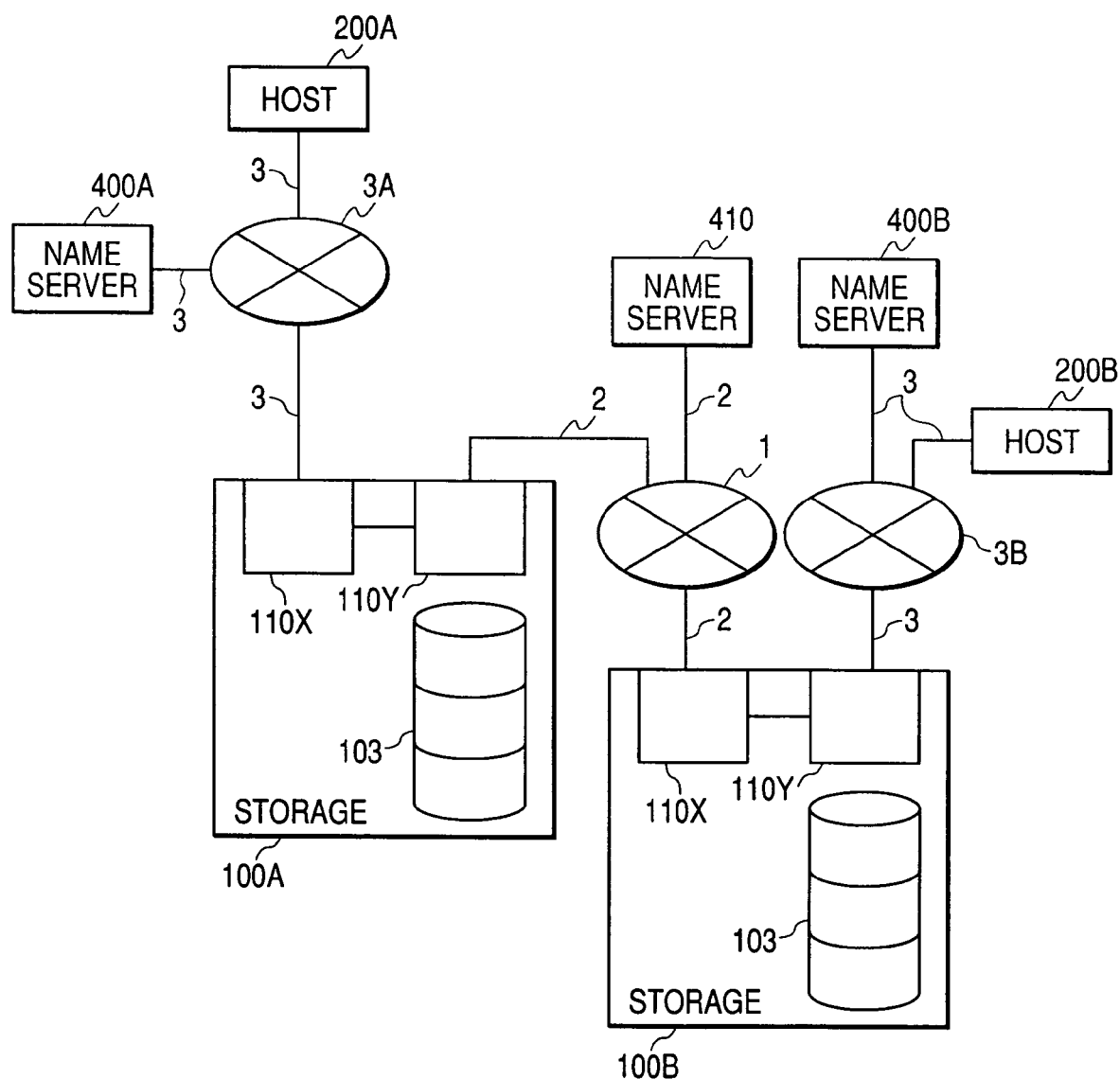
FIG. 2 is a block diagram showing an example of a storage system according to another embodiment.

In order for the initiator to access the target, it is necessary to know the relation between the address of the target and an identifier. For this purpose, any method can be selected from among (1) a method to directly input the information of an available target (a network address and an identifier) in the host, (2) a method using a name server to manage the information of the available target, and (3) a method using a protocol (a discovery protocol) to automatically search the target available for the host. For the FC, using the method (2) in order for a fabric (switch) serving as a medium of connection to have a name server function is typical, however, for the iSCSI, the methods (1) and (3) also can be used. For example, as shown in FIG. 2, when the hosts 200A and 200B are not connected to the storage apparatuses 100A and 100B directly, but are connected via FC networks 3A and 3B, or when the storage apparatus 100A and the storage apparatus 100B are connected to each other via the IP network 1, name servers 400A, 400B and 410 may be connected to respective networks 3A, 3B and 1, respectively.

In addition, the above-described storage apparatus 100 is connected to a communication line 3 at the host side and a communication line 2 at the side of the other storage apparatus 100, which are different physically; however, when branching one communication line in mid-course using a router or the like, one branched line may be connected to the host 200 and other branched line may be connected to the other storage apparatus 100 via the IP network 1. In this case, there is one frontend I/F of the storage apparatus 100.

As shown in FIG. 3, in the owner information table 117Y, which is stored in the control memory 115Y of the second I/F 110Y, the ID of the storage apparatus 100 which is used for managing the access to the corresponding LU corresponds to each LU one by one. The contents of the owner information table 117Y belonging to respective storage apparatuses 100A, 100B and 100C are the same. In the example of this owner information table 117Y, the owner managing the access to the LU 0, namely, the owner managing the lock information of the LU 0 is the storage apparatus 100A; the owner managing the lock information of the LU 1 is the storage apparatus 100B; and the owner managing the lock information of the LU 2 is the storage apparatus 100C. In the meantime, the data within this owner information table 117Y is basically set by an instruction from the management server 300.

Figure 5:
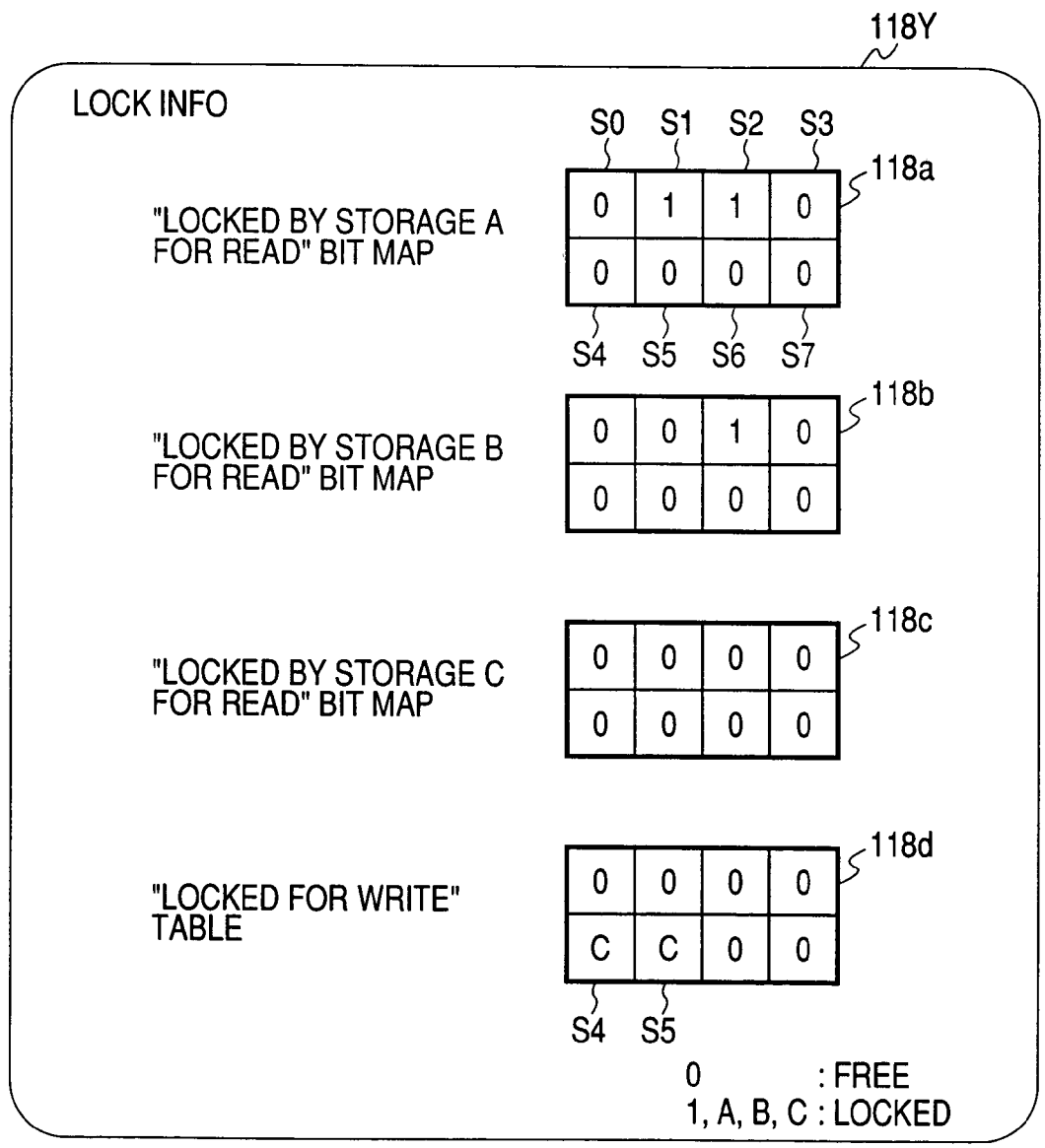
FIG. 5 is a diagram showing an example of a lock information table according to the first embodiment of the present invention.

In addition, as shown in FIG. 5, the lock information table 118Y that is stored in the control memory 115Y of the second I/F 110Y has lock information tables for reading 118a, 118b and 118c, indicating the access processing to which a storage area is restricted for the read request processing, and a lock information table for writing 118d, indicating the access processing to which a storage area is restricted for the write request processing. At each table, columns corresponding to a plurality of storage areas S0 to S7 configuring the LU are provided, and the information whether or not the access to the corresponding storage area is restricted is stored in each column.

According to the present embodiment, specifically, (1) it is not possible to perform any of read processing and write processing with respect to a storage area in the middle of performing write request processing, and (2) the access restriction under which write processing is impossible is applied to the storage area in the middle of performing read request processing.

The lock information table for writing 118d indicates that "any of the storage apparatuses is in the middle of locking the corresponding storage area in order to process the write request from the host" with respect to respective storage areas S0 to S7; and, in the columns corresponding to the storage areas S0 to S7, an identifier of the storage apparatus processing the write request is stored. According to this example, it is indicated that the storage areas S4 and S5 are locked for the write processing of the storage apparatus 100C.

In addition, the lock information table for reading 118a may indicate the storage area in which the storage apparatus 100A is in the middle of performing read request processing; the lock information table for reading 118b may indicate the storage area in which the storage apparatus 100B is in the middle of performing the read request processing; and the lock information table for reading 118c may indicate the storage area in which the storage apparatus 100C is in the middle of performing read request processing. For example, the lock information table for reading 118a for the storage apparatus 100A may indicate that "storage apparatus A is in the middle of locking the corresponding storage area in order to process the read request from the host A" with respect to respective storage areas S0 to S7; and, in the columns corresponding to the storage areas S0 to S7, "1" is stored indicating that the storage apparatus A locks the corresponding storage area, or "0" is stored indicating that the storage apparatus A does not lock the corresponding storage area. According to this example, it is indicated that the storage areas S1 and S2 are locked for the read request processing of the storage apparatus 100A.

In the control memory 115Y of respective storage apparatuses 100A, 100B and 100C, the lock information table 118Y related to a LU of which the owner is the control memory 115Y itself is stored. According to the present embodiment, in the control memory 115Y of the storage apparatus 100A, the lock information table 118Y related to the LU 0 is stored; in the control memory 115Y of the storage apparatus 100B, the lock information table 118Y related to the LU 1 is stored; and in the control memory 115Y of the storage apparatus 100C, the lock information table 118Y related to the LU 2 is stored.

Figure 12:
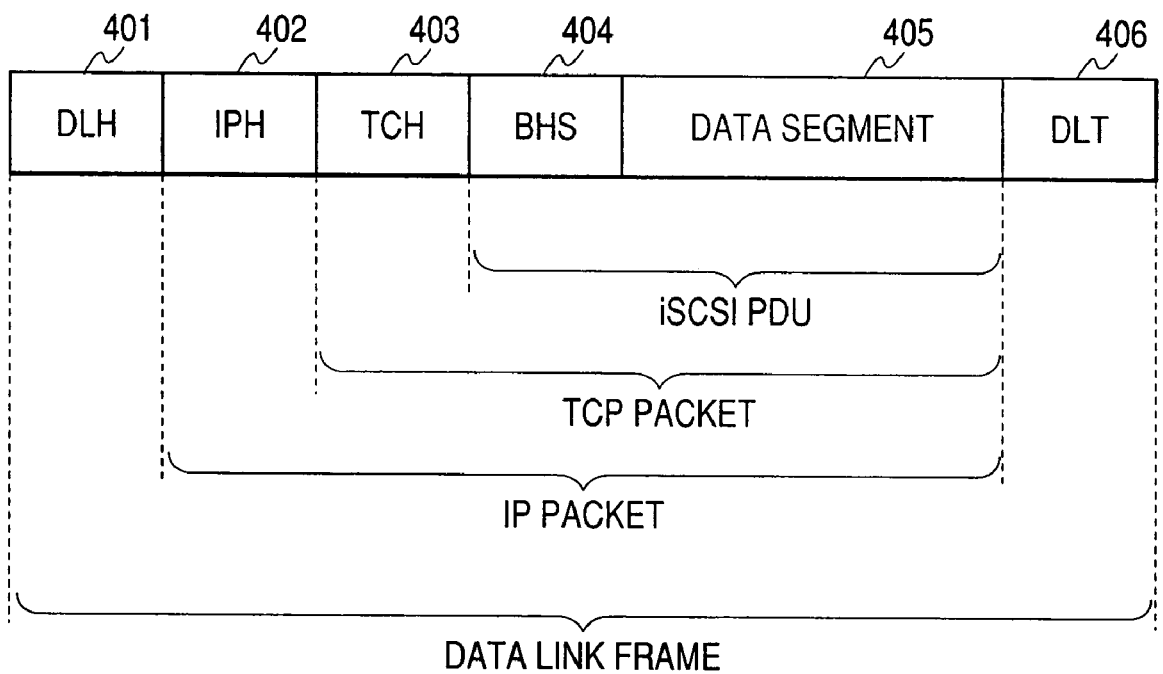
FIG. 12 is a diagram showing a format which is used upon transferring iSCSI PDU on a network.

Next, with reference to FIG. 12, an example of the format of a packet of the iSCSI to be used for communication between the initiator and the target will be described.

In the iSCSI, a PDU (iSCSI Protocol data Unit) serving as a unit of data communication is structured by a BHS (Basic Header Segment) 404 and a data segment 405. An AHS (Additional Header Segment) is occasionally inserted between the BHS 404 and the segment 405; however, in the example shown in FIG. 12, this is omitted. In the iSCSI, as a lower protocol layer, a TCP (Transmission Control Protocol) layer, an IP layer, and a data link layer are used. According to the present embodiment, the data link layer is a Gigabit Ethernet (Ethernet is a registered trade mark of Xerox Corporation (U.S.A.)). In these protocol layers, at a head of the packet to be treated by the iSCSI layer, a TCP header 403, an IP header 402, and a data link header 401 are added. Further, a data link trailer 406 is added to the last of the iSCSI packet in the data link layer.

A header to be added in each protocol layer may include the information necessary for the transmission and reception of the data (the address information to identify a transmission source and a transmission destination or the like). With reference to these headers, the transmission source of the PDU can be identified.

Next, with reference to FIG. 13, the above-described format of the iSCSI PDU will be described.

The reference numeral 410 denotes an area from 0 to the third byte from the head of an iSCSI PDU, and it has an OP Code area (0 byte from the head and from 29th bit to 24th bit as a bit position indicated in units of 4 bytes). The OP Code is defined by the iSCSI standard. For example, if this iSCSI PDU is a SCSI Command PDU delivering a SCSI command, it is defined as 0x01(0x means hexadecimal and so on); if this iSCSI PDU is a Text Request PDU, it is defined as 0x04; and, if this iSCSI PDU is Text Response PDU, it is defined as 0x24.

The reference numeral 411 denotes an area from the fourth to the seventh byte of the iSCSI PUD, and it indicates the data length of AHS and the length of a data segment.

The reference numeral 412 denotes an area from the eighth to the fifteenth byte of the iSCSI PDU, and it stores a LUN (Logical Unit Number) as the identification information of the LU or the information depending on the OP code.

The reference numeral 413 denotes an area from the sixteenth to the nineteenth byte of the iSCSI PDU, and it stores an Initiator Task Tag. The Initiator Task Tag indicates correspondence between a SCSI command issued by the initiator and the response and the data with which the target responds.

The reference numeral 414 denotes an area from the 20th to the 47th byte of the iSCSI PDU, and it stores information depending on the OP code. In the SCSI Command PDU, an expected data transfer length (a data length to be read and written) and the information describing a SCSI command (SCSI CDB) or the like are stored in this area.

The area including areas 410, 411, 412, 413 and 414 is a BHS 404, which has been described with reference to FIG. 12.

The reference numeral 405 denotes an area from the 48th byte and after when there is no AHS in the iSCSI PDU and this area is a data segment, which was described with reference to FIG. 12. This data segment may be omitted depending on a variation of the PDU.

According to the present embodiment, the lock reservation request for reading, the lock reservation request for writing, the lock release request for reading, and the lock release request for writing are transmitted as the Text Request PDU of iSCSI, respectively. The Text Request PDU is a PDU to be transmitted from the initiator, and a response from the target is the Text Response PDU. These PDUs are used for communication to exchange various operational parameters between the initiator and the target.

By the lock reservation request for reading, "X-com.xxx.ReadLockReq=Yes", indicating that the request is the lock reservation request for reading, and a number for identifying a target area requesting lock reservation are stored in the data segment of the Text Request PDU in a TEXT format, such as "X-com.xxx.TargetArea=123", which can be set in an iSCSI standard uniquely by a vendor. In addition, the LUN indicating a target LU is stored in the area 412 shown in FIG. 13.

The response to the lock reservation request for reading is stored in the data segment of the Text Response PDU. In the case of lock reservation acceptance, this response is stored as "X-com.xxx.ReadLockReq=Accept", and in the case of lock reservation reject, it is stored as "X-com.xxx.ReadLockReq=Reject".

In the same way, by the lock reservation request for writing, "X-com.xxx.WriteLockReq=Yes", indicating that the request is the lock reservation request for writing, and a number for identifying a target area requesting lock reservation are stored in the data segment of the Text Request PDU in a TEXT format, such as "X-com.xxx.TargetArea=123", which can be set in an iSCSI standard uniquely by a vendor. In addition, the LUN indicating a target LU is stored in the area 412 shown in FIG. 13.

The response to the lock reservation request for writing is stored in the data segment of the Text Response PDU. In the case of lock reservation acceptance, this response is stored as "X-com.xxx.WriteLockReq=Accept", and in the case of lock reservation reject, it is stored as "X-com.xxx.WriteLockReq=Reject".

By the lock release request for reading, "X-com.xxx.ReadUnLockReq=Yes", indicating that the request is the lock release request for reading, and a number for identifying a target area requesting lock release are stored in the data segment of the Text Request PDU in a TEXT format, such as "X-com.xxx.TargetArea=123", which can be set in an iSCSI standard uniquely by a vendor. In addition, the LUN indicating a target LU is stored in the area 412 shown in FIG. 13.

By the lock release request for writing, "X-com.xxx.WriteUnLockReq=Yes", indicating that the request is the lock release request for writing, and a number for identifying a target area requesting lock release are stored in the data segment of the Text Request PDU in a TEXT format, such as "X-com.xxx.TargetArea=123", which can be set in an iSCSI standard uniquely by a vendor. In addition, the LUN indicating a target LU is stored in the area 412 shown in FIG. 13.

In the second I/F 110Y of respective storage apparatuses, a system may be constructed determining a priority of processing of a program of a control processor so as to process transmission and reception of such a lock reservation request in preference to the PDU to be used for remote copy of the data.

Next, with reference to the flow charts shown in FIGS. 6 to 11, the operation of one storage apparatus configuring the storage system according to the present embodiment will be described.

Figure 6:
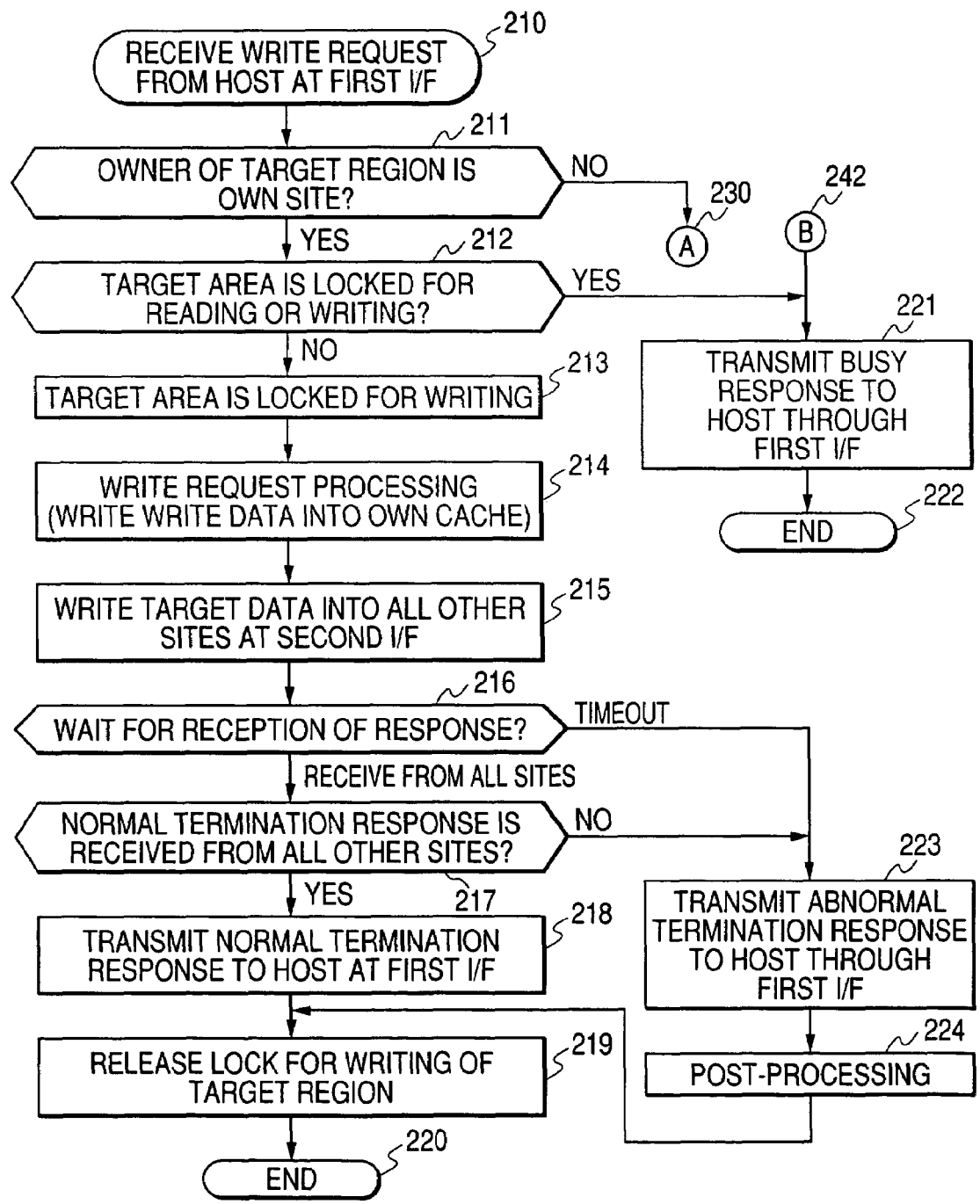
FIG. 6 is a flow chart showing an example of the processing when the storage apparatus according to the first embodiment of the present invention receives a write request from a host (1)
Figure 7:
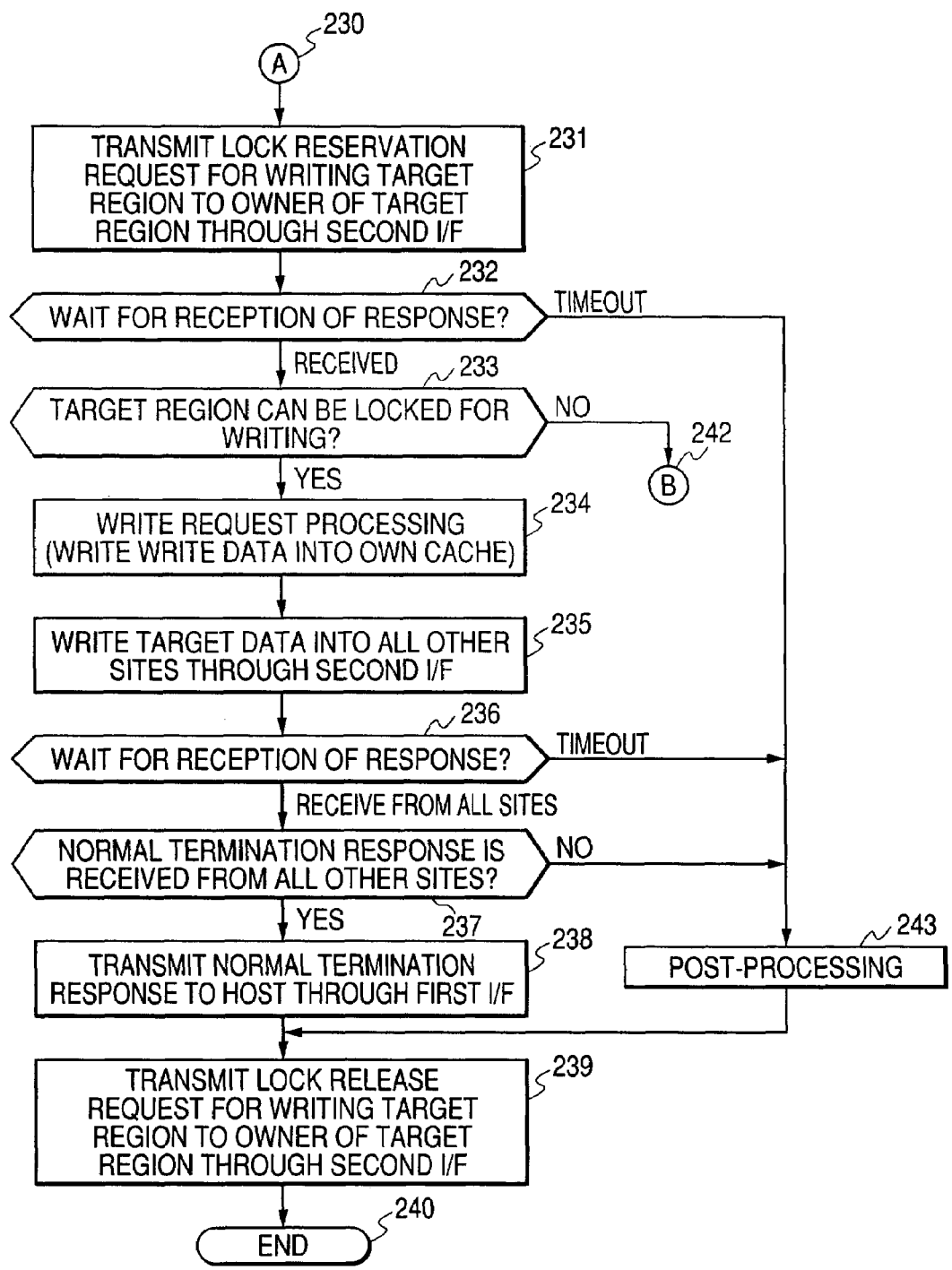
FIG. 7 is a flow chart showing an example of the processing when the storage apparatus according to the first embodiment of the present invention receives a write request from a host (2)

At first, with reference to the flow charts shown in FIGS. 6 and 7, the operation which is carried out when the storage apparatus 100 receives a write request from the host 200 will be described.

Receiving the write request from the host 200 via the front end I/F 111X of the first I/F 110X, the access request reception unit 121X of the controller 120X of the first I/F 110X may pass this write request to the owner judgment processing unit 121Y of the second I/F 110Y (step 210). This owner judgment processing unit 121Y may judge whether or not the owner of the LU that is instructed by the write request is its own site (namely, its own storage apparatus) with reference to the owner information table 117Y (step 211). As a result of the judgment, in the case of NO, the procedure will proceed to step 230 shown in FIG. 7.

In addition, as a result of the judgment in step 211, when it is determined that the owner of the LU that is instructed by the write request is its own site, the owner access processing unit 122X of the first I/F 110X judges whether or not the target area (track) that is instructed by the write request has already been locked for the reading processing or writing processing (step 212). This judgment will be performed with reference to the lock information table 118Y that is held by this storage apparatus. In other words, it is judged whether or not a column of a target area of any of the respective lock information tables 118a to 118d shown in FIG. 5 is locked.

As a result of a judgment in step 212, when it is determined that the target area has already been locked, the owner access processing unit 122X transmits a busy response indicating that the write request processing cannot be performed to the host 200 through the front end I/F 111X (step 221) so as to terminate the processing (step 222) because any storage apparatus 100 performs the access processing for the target area when the target area has been already locked; and, in order to maintain consistency of the data between respective sites with each other, the write request processing should not be performed. In addition, as a result of a judgment in step 212, when the target area has not been locked, this target area is locked. In other words, an identifier (such as A, B, C) showing its own storage apparatus is stored in the column of the target area of the lock information table for writing 118d shown in FIG. 5 (step 213). After that, the owner access processing unit 122X may perform write request processing in response to the instruction from the host 200. In other words, the owner access processing unit 122X returns a frame—referred to as R2T indicating that the owner access processing unit 122X is ready to receive the data—to the host 200 and stores the write data transmitted from the host 200 to the cache memories 112X and 112Y. Then, the write data stored in the cache memory 112X is used for writing the data into the disk device 101 (called destage) (step 214).

After that, alternatively, in parallel with the processing at the step 214, the remote copy processing unit 122Y of the second I/F 110Y may remote copy the write data that is received from the host 200 into all other storage apparatuses 100 (step 215). This is realized by allowing the other storage apparatus 100 to write-process the write data stored in the cache memory 112Y of the second I/F 110Y. This processing has a less adverse effect on the first I/F 110X since it is performed by the second I/F 110Y. In other words, there is a less adverse effect on the communication with the host 200 and storage of the data into the disk device 101. The information necessary for remote copy (the LU, the target area, the data length) is extracted from the write request that is received at the step 210 to be transmitted from the controller 120X of the first I/F 110X to the controller 120Y of the second I/F 110Y via the communication path 119.

After the processing in the step 215, the remote copy processing unit 122Y may wait for reception of a termination response with respect to the write request in the remote copy processing (step 216). When the remote copy processing unit 122Y receives the response from all other storage apparatuses 100 within a predetermined time, the procedure will proceed to step 217; and, when it cannot receive all responses even if the predetermined time has not passed, the procedure will proceed to step 223.

In the step 217, the remote copy processing unit 122Y may judge whether or not a normal termination response has been received from all other sites. When all other sites transmit a normal termination response, since the write data from the host 200 is copied into all storage apparatuses 100 configuring the storage system so as to allow the common storage image 103 to be updated in the newest status, the owner access processing unit 122X of the first I/F 110X may respond to the normal termination of the write request to the host 200 (step 218). Then, the owner access processing unit 122X may release the target area that is locked for the write request processing in the step 213, namely, it may store "0" in the column of the corresponding area of the lock information table for writing 118d (step 219) to terminate the processing (step 220).

In addition, when a time-out error is generated in the step 216, alternatively, when the response indicating an abnormal termination for writing of the data is received from any site in the step 217, the owner access processing unit 122X may respond to the abnormal termination of the write request to the host 200 (step 223); and, after performing the post-processing (step 224), the owner access processing unit 122X may terminate the processing (step 220). In the meantime, as the post-processing in this case, for example, a retry of the remote copy processing in the step 215 or the like may be considered.

Next, in the above-described step 211, it is judged whether the owner of the LU including the write target area is not its own site. The operation which is carried out after proceeding to step 230 will be described below with reference to the flow chart shown in FIG. 7.

After step 230, the owner judgment processing unit 121Y of the second I/F 110Y may transmit the lock reservation request for requesting reservation of a lock in order to write-process the target area (step 231). After that, while waiting for a response to the lock reservation request (step 232), when the owner judgment processing unit 121Y receives a response within a predetermined time, it may judge whether or not the target area can be locked from the response for writing (step 233). In this judgment, when it is determined that the target area is not locked, the procedure will proceed to step 221 shown in FIG. 6 because it is thought that the target area has already been locked (step 242).

When it is determined that the target area is locked for the write processing in step 233, the non-owner access processing unit 123X of the first I/F 110X may perform write request processing in response to the instruction from the host 200 (step 234). In other words, returning a frame referred to as R2T indicating that the non-owner access processing unit 123X is ready to receive the data to the host 200, the non-owner access processing unit 123X may store the write data that is transmitted from this host 200 in the cache memories 112X and 112Y. The write data that is stored in the cache memory 112X of the first I/F 110X is used for writing the data into the disk device 101 (destage) after that.

After that, alternatively, in parallel with the processing at the step 234, in the same way as the processing in the above-described step 215, the remote copy processing unit 122Y of the second I/F 110Y may remote copy the write data that is received from the host 200 into all other storage apparatuses 100 (step 235).

After the processing in the step 235, the remote copy processing unit 122Y may wait for reception of a termination response with respect to the write request in the remote copy processing (step 236). When the remote copy processing unit 122Y receives a response from all other storage apparatuses 100 within a predetermined time, the procedure will proceed to step 237; and, when it cannot receive all responses even if the predetermined time has not passed, the procedure will proceed to step 243.

In the step 237, the remote copy processing unit 122Y may judge whether or not a normal termination response is received from all other storage apparatuses 100. When all of them transmit a normal termination response, since the write data from the host 200 is copied into all storage apparatuses 100 configuring the storage system so as to allow the common storage image 103 to be updated in the newest status, the non-owner access processing unit 123X of the first I/F 110X may respond to the normal termination of the write request to the host 200 (step 238). Then, the lock release request reception and transmission unit 125Y may transmit the lock release request for writing of the target area to the owner of the LU including the target area (step 239) in order to release the target area that is locked for the write processing in the step 231 to terminate the processing (step 240).

In addition, when a time-out error is generated in the step 232 or step 236, alternatively, when the response indicating an abnormal termination for writing of the data is received from any storage apparatus 100 in the step 237, the owner access processing unit 122X may perform post-processing, such as responding of the abnormal termination of the write request to the host 200 (step 243), and then, the owner access processing unit 122X may proceed to the above-described step 239.

As described above, according to the present embodiment, when the storage apparatus 100 receives a write request from the host 200, if this storage apparatus 100 is the owner of the LU including the target area of the write request, locking the target area and restricting the access request processing at the other storage apparatus 100, this storage apparatus 100 may perform the write request processing with respect to the target area; and, upon transmitting the write data related to the write request to the other storage apparatuses 100, this storage apparatus 100 may transmit the write data related to the write request to perform the remote copy processing. In addition, when this storage apparatus 100 is not the owner of the LU including the target area of the write request, this storage apparatus 100 may transmit the lock reservation request to the target area to lock the target area; and, restricting the access request processing in the other storage apparatus 100, this storage apparatus 100 may perform write request processing to the target area, and transmitting the write data related to the write request to the other storage apparatus 100, this storage apparatus 100 may perform the remote copy processing. Accordingly, before and after the write request processing, the content of the common storage image 103 is different in respective storage apparatuses 100A, 100B, and 100C, however, it is possible to preserve uniformity of the common storage image 103 held by respective storage apparatuses 100A, 100B, and 100C, respectively.

Figure 8:
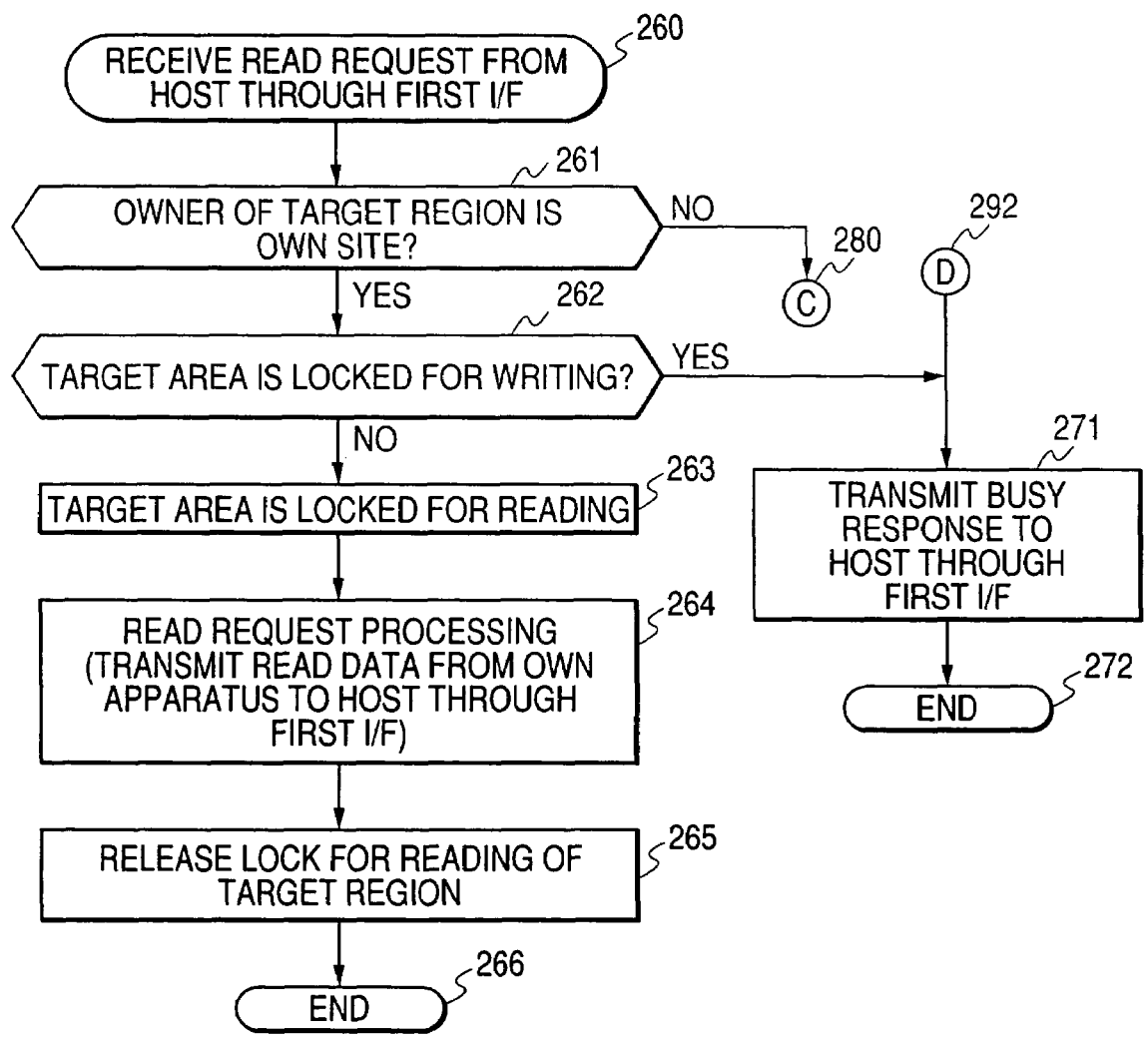
FIG. 8 is a flow chart showing an example of the processing when the storage apparatus according to the first embodiment of the present invention receives a read request from a host (1)
Figure 9:
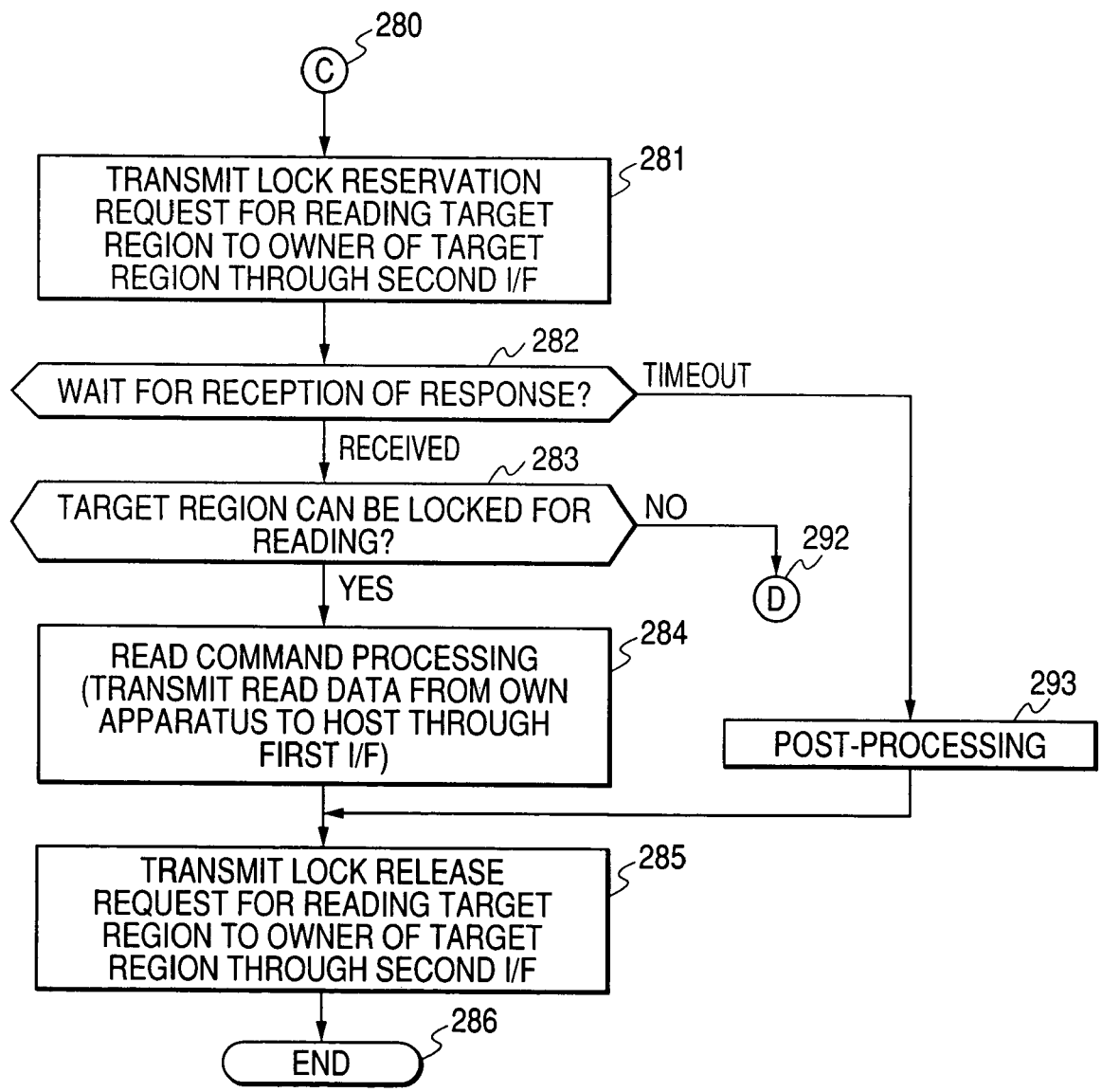
FIG. 9 is a flow chart showing an example of the processing when the storage apparatus according to the first embodiment of the present invention receives a read request from a host (2)

Next, with reference to the flow charts shown in FIG. 8 and FIG. 9, the operation which is carried out when the storage apparatus 100 receives a read request from the host 200 will be described below.

Receiving the read request from the host 200 via the front end I/F 111X of the first I/F 110X, the access request reception unit 121X of the controller 120X of the first I/F 110X may pass this read request to the owner judgment processing unit 121Y of the second I/F 110Y (step 260). This owner judgment processing unit 121Y may judge whether or not the owner of the LU that is instructed by the read request is its own site with reference to the owner information table 117Y (step 261). As a result of judgment, in the case of NO, the procedure will proceed to step 280 shown in FIG. 9.

In addition, as a result of judgment in the step 261, when it is determined that the owner of the LU that is instructed by the read request is its own site, the owner access processing unit 122X of the controller 120X of the first I/F 110X judges whether or not the target area that is instructed by the read request has already been locked for the writing processing (step 262). This judgment will be performed with reference to the lock information table 118Y that is held by this storage apparatus itself. In other words, it is judged whether or not a column of a target area of the lock information tables for writing 118d shown in FIG. 5 is locked.

As a result of judgment in the step 262, when it is determined that the target area has already been locked, the owner access processing unit 122X transmits a busy response indicating that the write request processing cannot be performed to the host 200 through the front end I/F 111 (step 271) so as to terminate the processing (step 272). In addition, as a result of judgment of the step 262, when the target area has not been locked, this target area is locked. In other words, "1" indicating that the storage apparatus 100 locks the corresponding storage area is stored in the column of the target area of the lock information tables for reading shown in FIG. 5 (any of 118a to 118c) (step 263). After that, the owner access processing unit 122X may perform read request processing in response to the instruction from the host 200 (step 264). In other words, reading the data of the target area that is indicated by the read request from the cache memories 112X, 112Y or the disk device 101, the owner access processing unit 122X may return this data to the host 200 via the front end I/F 111X. It should be noted that the data to be read is not necessarily read from another site through the second I/F 110Y. After terminating the read request processing, the owner access processing unit 122X may transmit a response indicating the normal termination of the read request to the host 200.

After that, the owner access processing unit 122X may release the target area that is locked for the read request processing in the step 263, namely, the owner access processing unit 122X may store "0" in the column of the corresponding area of the lock information table for reading (any of 118a to 118c) so as to terminate the processing (step 266).

Next, in the above-described step 261, it is determined that it is the owner of the LU including the read target area.

The operation after proceeding to step 280 will be described below with reference to the flow chart shown in FIG. 9.

After step 280, the owner judgment processing unit 121Y of the second I/F 110Y may transmit the lock reservation request to the owner of the LU including the target area so as to reserve a lock for performing read processing for the target area (step 281). After that, waiting for a response of the lock reservation request (step 282), when the response can be received within a predetermined time, it is determined whether or not the target area can be locked for reading from the response (step 283). When it is determined that the target area cannot be locked, assuming that the target area has been locked, the operation will proceed to the step 271 in FIG. 8 (step 292).

When it is determined that the target area can be locked for reading in the step 283, the non-owner access processing unit 123X of the first I/F 110X may perform write request processing in response to the instruction from the host 200 (step 284). In other words, reading the data of the target area indicated by the read request from the cache memories 112X, 112Y or the disk device 101, the non-owner access processing unit 123X of the first I/F 110X returns this data to the host 200 via the front end I/F 111X. Here, it should be noted that the data to be read is not necessarily read from another site through the second I/F 110Y. After termination of the read request processing, the non-owner access processing unit 123X transmits a response indicating a normal termination of the read request to the host 200.

Then, in order to release the target area that is locked for the read processing in the step 281, a lock release request reception and transmission unit 125Y of the second I/F 110Y transmits the lock release request for reading of the target area to the owner of the LU including the target area (step 285) to terminate the processing (step 286).

In addition, when a time out is generated in the step 282, the non-owner access processing unit 123X may perform post-processing, such as responding of the abnormal termination of the read request to the host 200 (step 293), and then, the non-owner access processing unit 123X may proceed to the above-described step 285.

Figure 10:
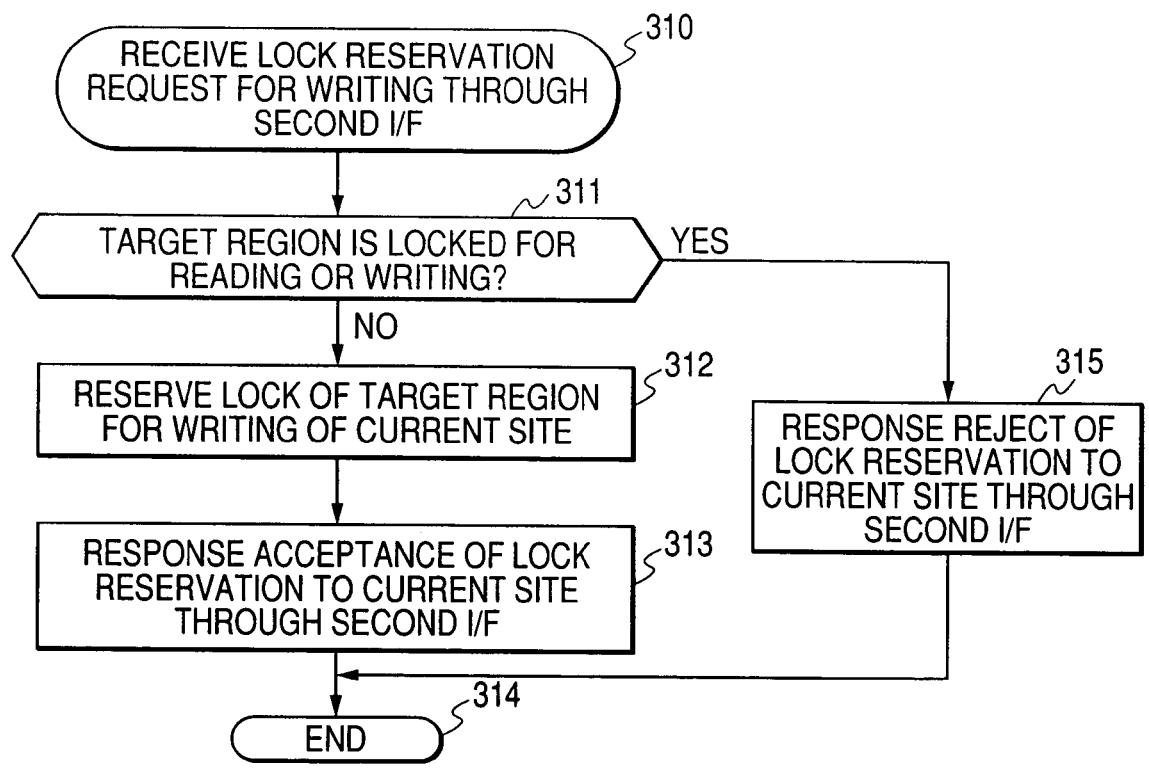
FIG. 10 is a flow chart showing an example of the processing when the storage apparatus according to the first embodiment of the present invention receives a lock reservation request for writing from another storage apparatus.

Next, with reference to a flow chart shown in FIG. 10, the operation which is carried out when the storage apparatus 100 receives the lock reservation request for writing from the other storage apparatus 100 will be described. In other words, in the operation to be described below, the transmission source of the lock reservation request for a write request is the non-owner site with respect to the LU including the target area of the write request that is received from the host of the transmission source, and this operation to be described below is the operation of the owner site when this transmission source is the owner site.

When the lock reservation request reception and transmission unit 123Y of the second I/F 110Y receives the lock reservation request for writing from another storage apparatus (the storage apparatus of the non-owner site) 100 (step 310), the lock reservation request processing unit 124Y determines whether or not the target area that is instructed by this lock reservation request for writing has already been locked for the reading or writing processing (step 311). In other words, the lock reservation request processing unit 124Y of the storage apparatus 100 as the owner of the LU including the target area determines this depending on whether or not the target areas of all lock information tables 118a to 118d shown in FIG. 5 are locked, namely, whether or not "0" is set in the columns of all target areas.

As a result of determination in the step 311, when all target areas are not locked, the lock reservation request processing unit 124Y may store the identifiers of the storage apparatus 100 (A, B, C or the like) that transmits the lock reservation request in the column of the target area of the lock information table for writing 118d (step 312). After that, the lock reservation request processing unit 124Y may transmit the information about acceptance of the lock reservation request to the storage apparatus 100 that transmits the lock reservation request (step 313) to terminate the processing (step 314). In the meantime, in this case, since the write data that is written in the transmission source of the lock reservation request for writing is transmitted from this transmission source for the remote copy processing, this write data is written in the target area regardless of whether or not the target area is locked. In other words, according to this embodiment, regardless of whether or not the target are is locked, when receiving the read request or the write request from another storage apparatus 100 through the second I/F 110Y, the lock reservation request processing unit 124Y may process the received request and respond. Further, after that, the lock release request is transmitted from the transmission source of the lock reservation request for writing. In the case of receiving this, the lock reservation request processing unit 124Y may set "0" indicating that the corresponding target area is not locked in the column of the target area of the lock information table for writing 118d.

On the other hand, when it is determined that the target area has already been locked for reading or for writing in step 311, any storage apparatus 100 makes access to this target area, and the consistency of the data cannot be maintained if the write processing is carried out in the storage apparatus 100 of the non-owner site that transmitted the lock reservation request. Therefore, upon transmitting a reject of the lock reservation request (informing that the lock cannot be reserved) (step 315) to the storage apparatus 100 of the non-owner site, the processing is terminated (step 314).

Figure 11:
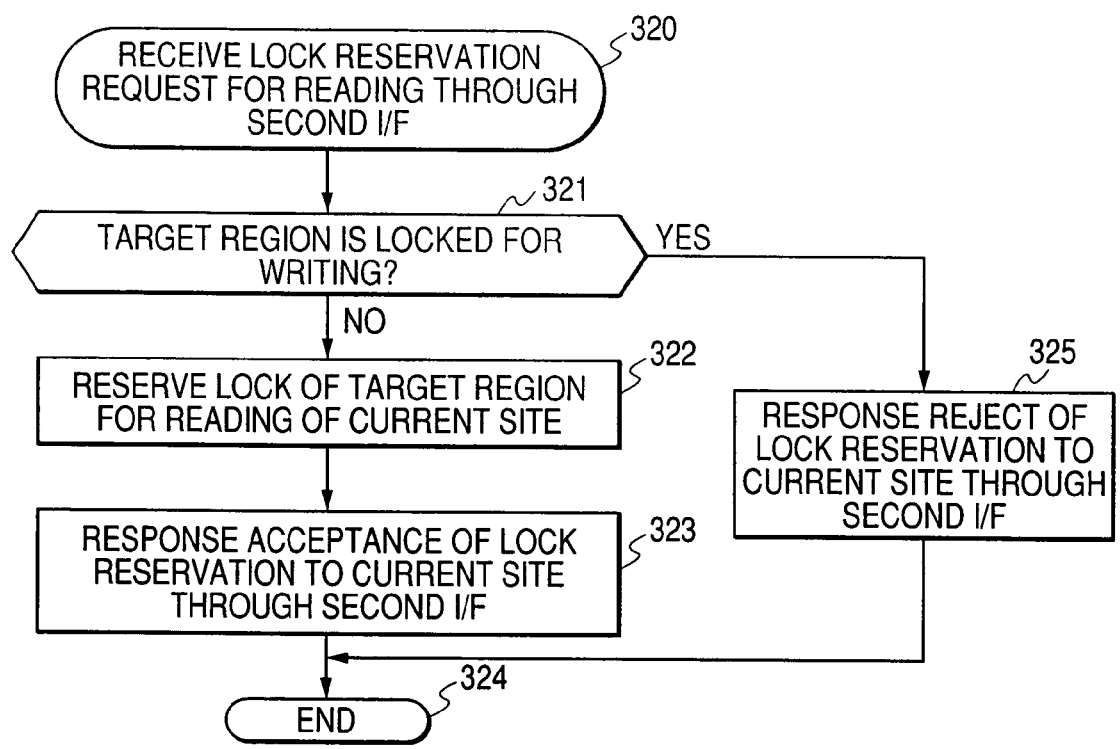
FIG. 11 is a flow chart showing an example of the processing when the storage apparatus according to the first embodiment of the present invention receives a lock reservation request for reading from another storage apparatus.

Next, with reference to the flow chart shown in FIG. 11, the operation which is carried out when the storage apparatus 100 receives the lock reservation request for reading from another storage apparatus 100 will be described.

When the lock reservation request reception and transmission unit 123Y of the second I/F 110Y receives the lock reservation request for writing from another storage apparatus (the storage apparatus of the non-owner site) 100 (step 320), the lock reservation request processing unit 124Y determines whether or not the target area that is instructed by this lock reservation request for reading has already been locked for the writing processing (step 321). In other words, the lock reservation request processing unit 124Y of the storage apparatus 100 as the owner of the LU including the target area determines this depending on whether or not the target areas of the information table 118d shown in FIG. 5 is locked, namely, whether or not "0" is set in the columns of all target areas.

As a result of the determination in step 321, when the target area is not locked for writing, the lock reservation request processing unit 124Y may set "1", indicating that the corresponding target area is locked, in the column of the target area of the lock information table for reading (any one of 118a to 118c) (step 322). After that, the lock reservation request processing unit 124Y may transmit the information about acceptance of the lock reservation request to the storage apparatus 100 that transmits the lock reservation request (step 323) to terminate the processing (step 324). In the meantime, after that, the lock release request is transmitted from the transmission source of the lock reservation request for reading. In the case of receiving this, the lock reservation request processing unit 124Y may set "0", indicating that the corresponding target area is not locked, in the column of the target area of the lock information table for reading.

On the other hand, when it is determined that the target area has already been locked for writing in the step 321, any storage apparatus 100 performs the write processing with respect to this target area. Therefore, upon transmitting a reject of the lock reservation request (informing that the lock cannot be reserved) (step 325) to the storage apparatus 100 of the non-owner site, the processing is terminated (step 324).

Figure 14:
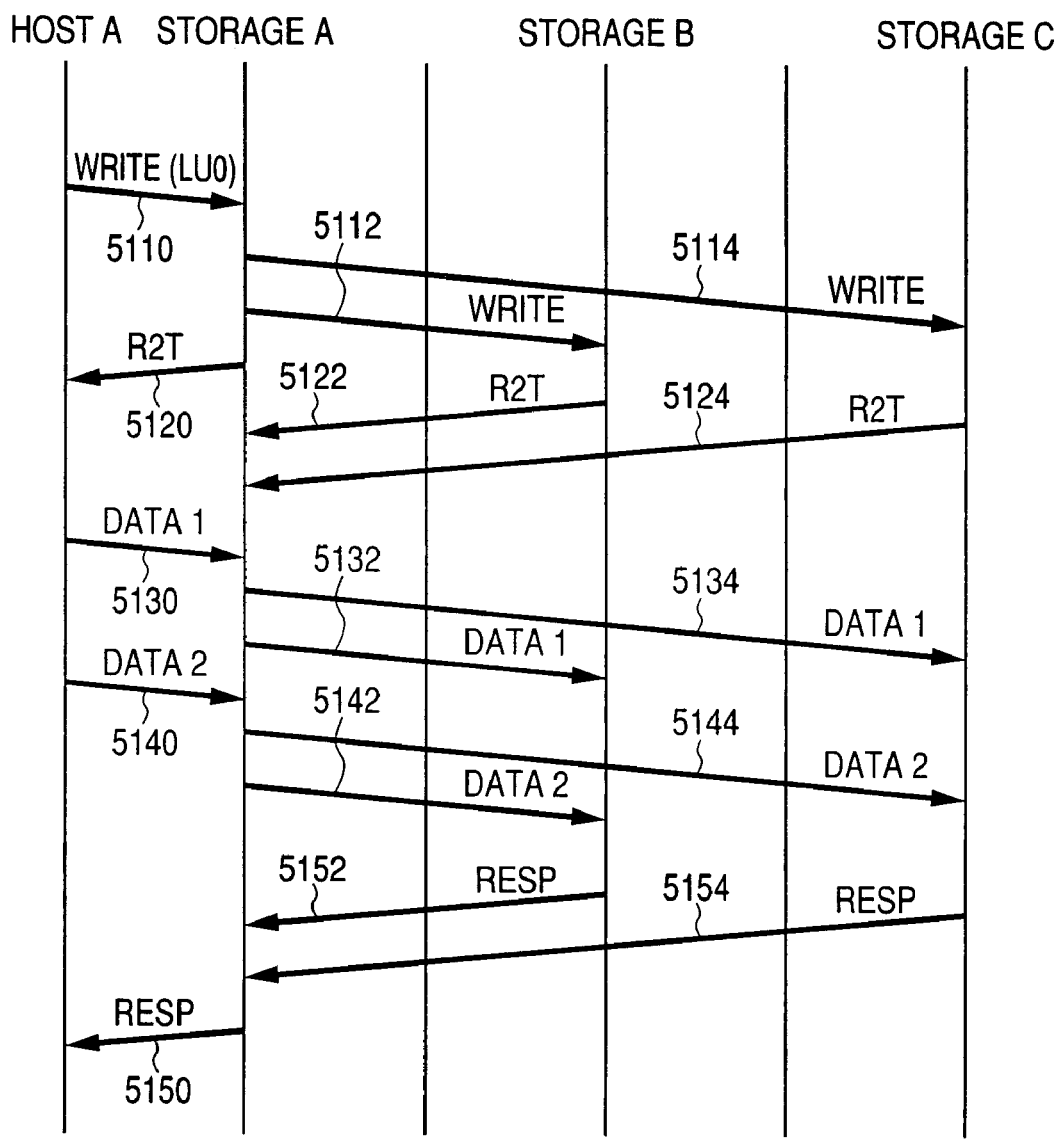
FIG. 14 is a diagram showing communication between respective sites when a storage apparatus structuring the storage system according to the first embodiment of the present invention receives a write request from the host (1)

Next, with reference to FIGS. 14 to 16, the communication between respective sites for processing the write request from the host 200 will be described.

At first, with reference to FIG. 14 and FIG. 15, the communication between respective sites from the host 200A to the storage apparatus 100A of the same site when the write request is issued to the area within the LU0 of which owner is the storage apparatus 100A will be described below.

When the first I/F 110X of the storage apparatus 100A receives the write request from the host 200A (step 5110), at first, with reference to the owner information table 117Y, the storage apparatus 100A recognizes that the owner of the LU0 indicated by this write request is its own apparatus. Then, with reference to the lock information table 118Y held in its own apparatus, the storage apparatus 100A may determine whether or not the target area is locked for reading or for writing. When the target area is not locked, in order to remote copy the write data with respect to the write request from the second I/F 110Y into all other storage apparatuses 100B and 100C within the storage system, the storage apparatus 100A may transmit the write request having the same SCSI CDB as the write request from the host 200A to all other storage apparatuses 100B and 100C (steps 5112, 5114). R2T is transmitted from other storage apparatuses 100B and 100C in response to the write request (steps 5112, 5124).

The storage apparatus 100A may respond with R2T through the first I/F 110X in order to proceed with the processing of the write request from the host 200A (step 5120). On the contrary, the write data is transmitted from the host 200A (steps 5130, 5140), so that this write data is transmitted to the storage apparatuses 100B and 100C of a remote copy destination through the second I/F 11Y, while write-processing this write data (steps 5132, 5134, 5142, 5144). In the meantime, the write data is transmitted after receiving the above-described R2T from other storage apparatuses 100B and 100C.

The storage apparatus 100A may check the normal termination of the remote copy by the reception of the normal termination response from all storage apparatuses 100B and 100C as the remote copy destinations (steps 5152, 5154). After that, the storage apparatus 100A may return the normal termination response of the write request to the host 200A (step 5150).

Figure 15:
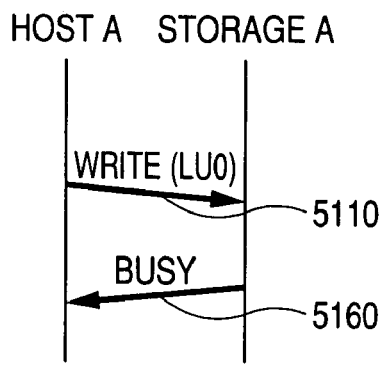
FIG. 15 is a diagram showing communication between respective sites when a storage apparatus structuring the storage system according to the first embodiment of the present invention receives a write request from the host (2)

In addition, as shown in FIG. 15, the storage apparatus 100A receives the write request from the host 200A (step 5110), and when determining that the target area is locked for reading or for writing, the storage apparatus 100A may return a BUSY message indicating that the write request cannot be processed at the present to the host 200A (step 5160).

Next, with reference to FIG. 16, the communication between respective sites from the host 200A to the storage apparatus 100A of the same site, when a write request is issued to the area within the LU1 of which the owner is the storage apparatus 100B of another site, will be described.

When the storage apparatus 100A of the same site receives a write request for the area in the LU1 from the host 200A (step 5210), at first, the storage apparatus 100A engages communication with the storage apparatus 100B as the owner of the LU1 with respect to reservation of a lock (steps 5125, 5127). Specifically, the storage apparatus 100A may transmit the lock reservation request for writing with respect to the target area of the LU1 to the storage apparatus 100B as the owner of the LU1 (step 5125) and may receive the acceptance of the lock reservation request for writing from this storage apparatus B (step 5127). Then, this storage apparatus 100A may perform processing of the write request that is identical with the processing carried out in the steps 5112, 5114, 5122, . . . , 5152, 5154, 5150 shown in FIG. 14 (steps 5112, 5114, 5122, . . . , 5152, 5154, 5150). Terminating the above-described write request processing, the storage apparatus 100A may transmit the lock release request for the target area of the LU1 to the storage apparatus 100B of the owner (step 5128).

Figure 17:
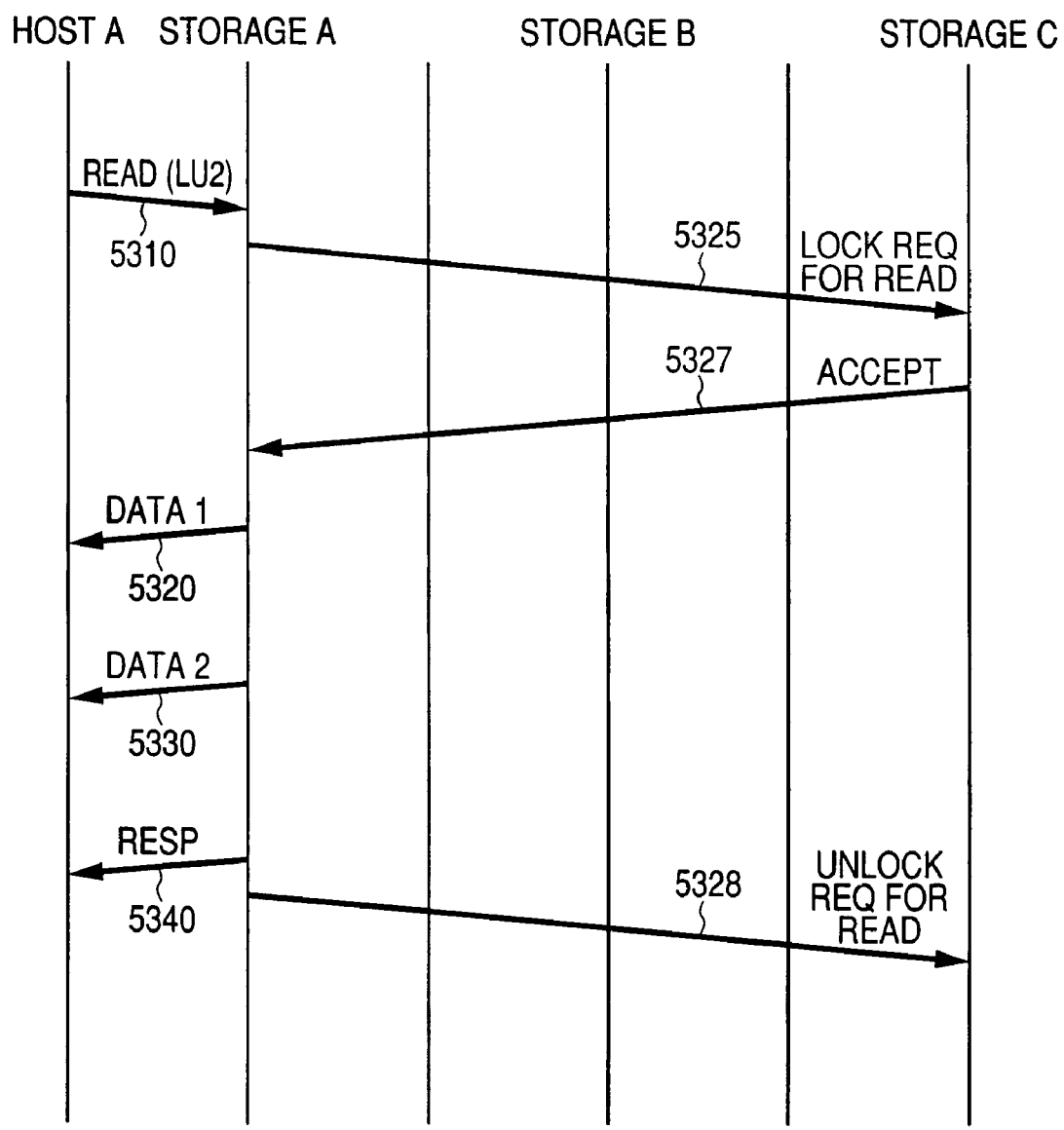
FIG. 17 is a diagram showing communication between respective sites when a storage apparatus structuring the storage system according to the first embodiment of the present invention receives a read request from the host (3)

Next, with reference to FIG. 17, the communication between respective sites from the host 200A to the storage apparatus 100A of the same site, when the read request is issued to the area within the LU2 of which the owner is the storage apparatus 100C of another site, will be described.

When the first I/F 110X of the storage apparatus 100A receives a read request from the host 200A (step 5310), at first, with reference to the owner information table 117Y, the storage apparatus 100A recognizes that the owner of the LU2 indicated by this read request is the storage apparatus 100C. Then, the storage apparatus 100A may transmit the lock reservation request for reading with respect to the area in the LU2 indicated by the read request to the storage apparatus 100C (step 5325). Receiving the acceptance of the lock reservation request for reading from this storage apparatus 100C as the owner (step 5327), the storage apparatus 100A may read the data that is stored in the target area from the cache memories 112X, 112Y of its own device or the disk device 101 and it may transmit the data to the host 200A (steps 5320, 5330). After that, the device 100A may transmit the normal termination response of the read request to the host (step 5340) and it may transmit the rock release request for reading to the storage apparatus 100C as the owner (step 5328).

As described above, according to the present embodiment, when the storage apparatus 100 receives the access request from the host 200, it judges whether or not this storage apparatus 100 is the owner of the LU including the target area of the access request. Then, if its own device is the owner, the storage apparatus 100 may lock the target area of the lock information table 118Y that is managed by its own device, and if the storage apparatus of another site is the owner, the storage apparatus 100 may lock the target area of the lock information table 118Y that is managed by the storage apparatus of the other site. Further, the storage apparatus 100 performs access processing for the target area with the access request processing at the other storage apparatus restricted, so that it is possible to reserve the mutual identity of the common storage images 103 held by respective storage apparatuses 100A, 100B, and 100C, respectively.

In addition, the present embodiment further has the following advantages:

(1) The (owner) site managing the lock information is determined for each LU, so that it is possible to avoid competition of the lock information and to disperse the load;
(2) Since each data has the same data image, reading is carried out at a high speed because the data is read from its own site without hopping to another site;
(3) Since the storage apparatus 100 is physically divided into the host side I/F 110X and the storage side I/F 110Y, the storage apparatus 100 has no adverse affect (a network load and a controller load) on the communication processing from the host 200. Further, since the host side I/F 110X and the storage side I/F 110Y are physically divided, different kinds of technology can be used. For example, it is possible to use a high-speed FC for the host side I/F 110X and to use the iSCSI for the storage side I/F 110Y.

In the meantime, according to the above-described embodiment, a lock release is carried out at the time when the read processing or the write processing is terminated; however, in the case where the lock is not released for a certain period of time even if the necessary processing is terminated and the access request for the same area is received from the host 200 during this time, without locking the target area newly, the new request processing may be performed. In addition, not only the area that is indicated as the writing target or the reading target by the access request from the host 200, but also the area subsequently located in the address space may be locked. Thereby, in the case where the host 200 makes access to long continuous data, in the next request, it is expected that the host 200 will make access to the area contiguous to the further area and a lock of that area is reserved in advance.

Employing such a control method, any communication delay via the network 1 and the overhead can be reduced, so that the response of the other storage apparatus is not necessarily delayed.

A Second Embodiment

Figure 18:
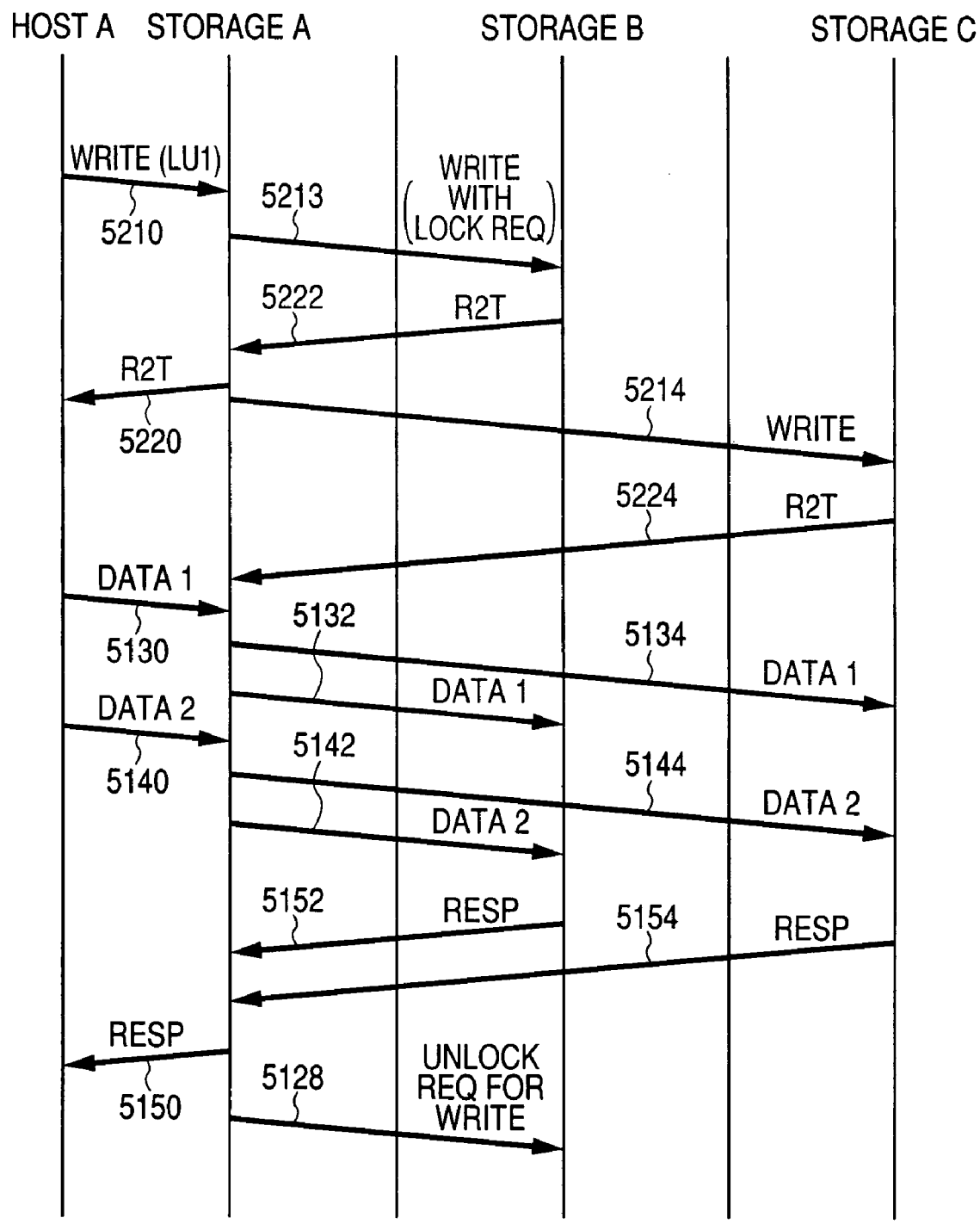
FIG. 18 is a diagram showing communication between respective sites when a storage apparatus structuring the storage system according to a second embodiment of the present invention receives a write request from the host.

Next, with reference to FIG. 18, a storage system representing a second embodiment will be described.

According to the first embodiment, as a system for transmitting and receiving the lock reservation request and its response to and from the storage apparatus 100 of another site in the second I/F 110Y, a Text Request PDU of the iSCSI and a Text Response PDU are employed. In addition, in the second I/F 110Y, if the read request and the write request are received from the storage apparatus 100 of the other site differently from the above-described lock reservation request, without checking whether or not the target area is particularly locked, the received request is processed and the storage apparatus 100A may respond through the second I/F 110Y.

According to the present embodiment, the communication overhead is reduced by including the corresponding write request in the lock reservation request for writing to be transmitted to the storage apparatus 100 of the other site through the second I/F 110Y and further including the corresponding read request in the lock reservation request for reading to be transmitted to the storage apparatus 100 of the other site through the second I/F 110Y so as to use the communication for request as the communication for lock reservation.

Here, the above-described processing will be described specifically with reference to FIG. 18. The present example shown in FIG. 18 corresponds generally to the above-described example shown in FIG. 16, and the present example indicates the communication that is carried out between respective sites in the case where the write request to the area in the LU1 of which the owner is the storage apparatus 100B of the other site is transmitted from the host 200A to the storage apparatus 100A of the same site.

When the storage apparatus 100A of the same site receives the write request to the area in the LU1 from the host 200A (step 5210), at first, the storage apparatus 100A may transmit the write request used as the lock reservation request of the target area to the storage apparatus 100B as the owner of the LU1 (step 5123). In other words, according to the present embodiment, the step 5216 and the step 5212 shown in FIG. 16 are performed as a whole in the step 5213. By setting a flag that has been determined in advance and transmitting it, the write request is also used as the lock reservation request for writing. It is also possible that this flag is defined as, for example, a reserve area of the iSCSI PDU and a vendor dependant area (if its bit is 1, this flag is also used as the lock reservation request). On the other hand, at first, the storage apparatus 100B of the other site receiving the write request to be used as the lock reservation request of the target area may check whether or not the target area has already been locked for reading processing or write processing. If the target area is not locked, the storage apparatus 100A may respond R2T in order to process the write request (step 5222). The acceptance response R2T of this write request may also function as an acceptance response for lock reservation. In other words, according to the present embodiment, the step 5127 and the step 5122 shown in FIG. 6 are carried out as a whole in the step 5222. Alternatively, if the target area has already been locked (not illustrated), the storage apparatus 100A may respond not with R2T, but with BUSY. This BUSY message is treated as a response of the lock reservation reject.

In the meantime, except for the lock reservation, the response of the lock reservation, and the command and the response consolidated in them, the second embodiment is identical with the above-described first embodiment. In addition, with respect to the lock reservation of the read request, the same processing is performed (not illustrated).

A Third Embodiment

Figure 19:
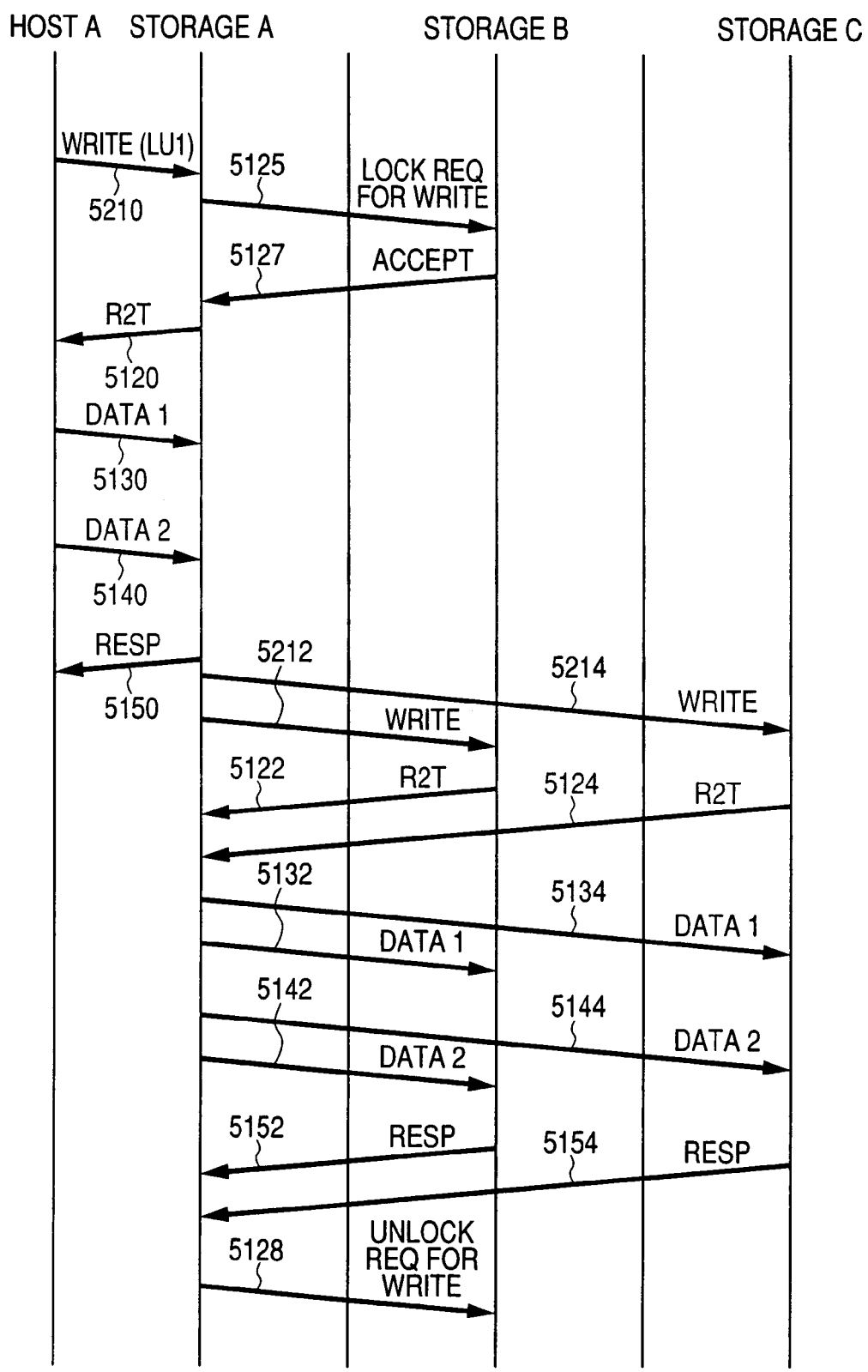
FIG. 19 is a diagram showing communication between respective sites when a storage apparatus structuring the storage system according to a third embodiment of the present invention receives a write request from the host.

Next, with reference to FIG. 19, a storage system representing a third embodiment will be described below.

According to the above-described first and second embodiments, the remote copy processing to all other storage apparatuses 100 in the storage system is performed for a write request from the host 200 just after the write processing in its own device 1; and, after this remote copy processing is terminated, the normal response is returned to the host 200. In other words, the remote copy processing is performed in synchronization with the write processing at its own device.

On the contrary, according to the present embodiment, for the write request from the host 200, write processing is performed by its own device 100 and after returning the normal response to the host 200, the remote copy processing for all other storage apparatuses 100 is carried out. In other words, according to the present embodiment, the remote copy processing is carried out asynchronously with the write processing by its own device.

Here, the above-described processing will be described specifically with reference to FIG. 19. The present example shown in FIG. 19 corresponds generally to the above-described example shown in FIG. 16, and the present example indicates the communication that is carried out between respective sites in the case in which the write request to the area in the LU1 of which the owner is the storage apparatus 100B of the other site is transmitted from the host 200A to the storage apparatus 100A of the same site.

Figure 16:
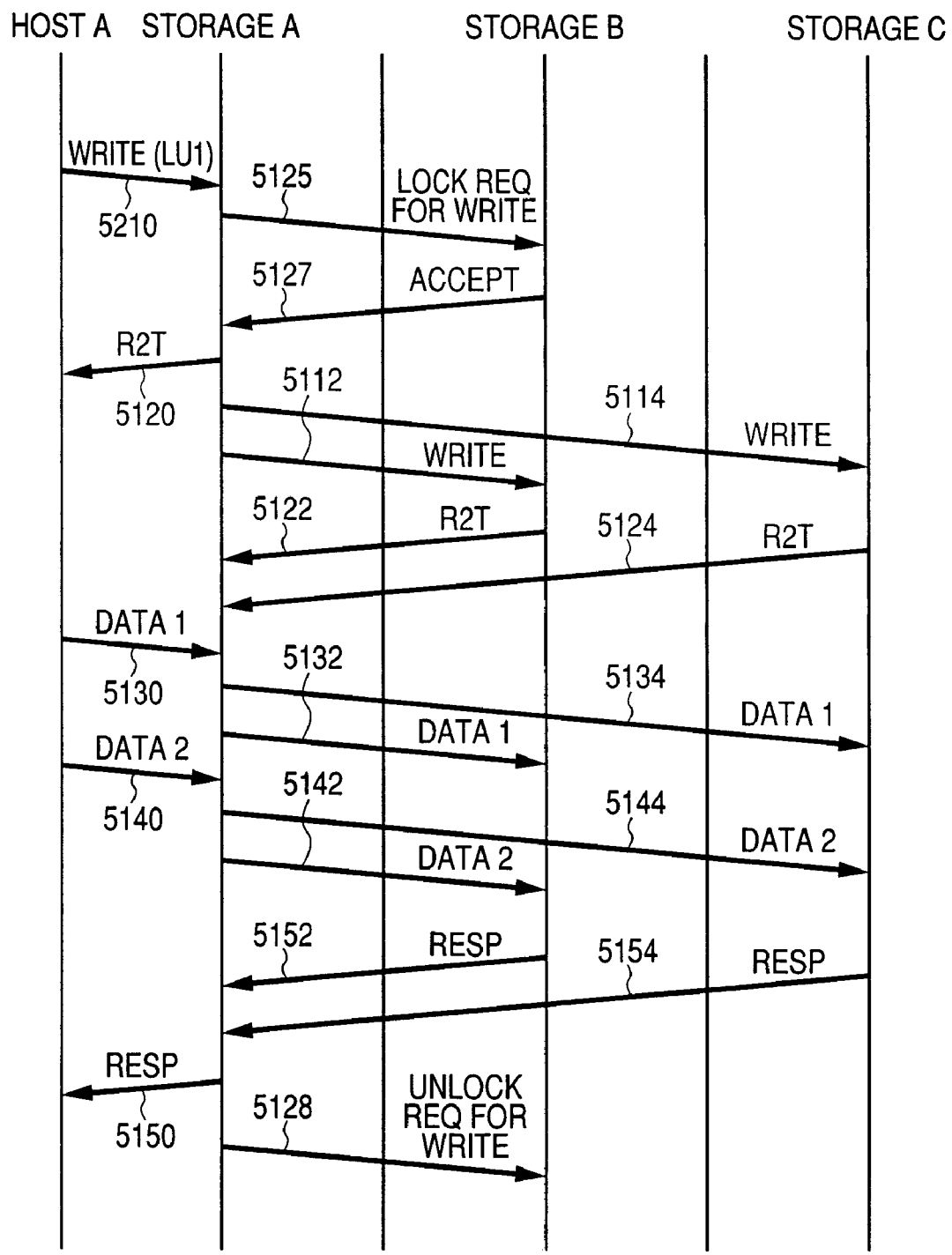
FIG. 16 is a diagram showing communication between respective sites when a storage apparatus structuring the storage system according to the first embodiment of the present invention receives a write request from the host (3)

When the storage apparatus 100A of the same site receives the write request to the area in the LU1 from the host 200A (step 5210), as in the example shown in FIG. 16, at first, the storage apparatus 100A may transmit the lock reservation request of the target area to the storage apparatus 100B as the owner of the LU1 (step 5125). After receiving the acceptance of the lock reservation request from this storage apparatus B (step 5127), the storage apparatus 100A may respond with R2T to the host 200A (step 5120).

According to the example shown in FIG. 16, after returning R2T to the host 200A (step 5120), without waiting for reception of the write data from the host 200A (steps 5130, 5140), the storage apparatus 100A transmits the write request for the remote copy to the storage apparatuses 100B and 100C of the other site (steps 5114, 5112). However, according to the present embodiment, after returning R2T to the host 200A (step 5120), without performing the remote copy processing, the storage apparatus 100A receives the write data from the host 200A (steps 5130, 5140) and transmits the normal termination response to the host 200A at a point of time when this write data is stored in the cache memories 112X and 112Y (step 5150). According to the present embodiment, after that, the remote copy processes (steps 5214, 5212, 5122, 5124, 5132, 5134, 5142, 5152, 5154 5128) are performed.

Assuming that an abnormality is caused upon copying the write data into the storage apparatuses 100B and 100C, the storage apparatus 100A may try to copy the write data into the storage apparatuses 100B and 100C again by using the write data held in the cache memory 112Y.

As described above, according to the present embodiment, although the identity when the plural hosts 200A, 200B, and 200C make access to the common storage image 103 is slightly lost, it is possible to largely shorten the response waiting time of the write request for the host 200.

In the meantime, according to the present embodiment, the write request from the storage apparatus 100A to the storage apparatuses 100B and 100C of the other site (steps 5212, 5214) may not always be transmitted after transmitting the normal termination response of the host 200A (step 5150).

A Fourth Embodiment

Figure 20:
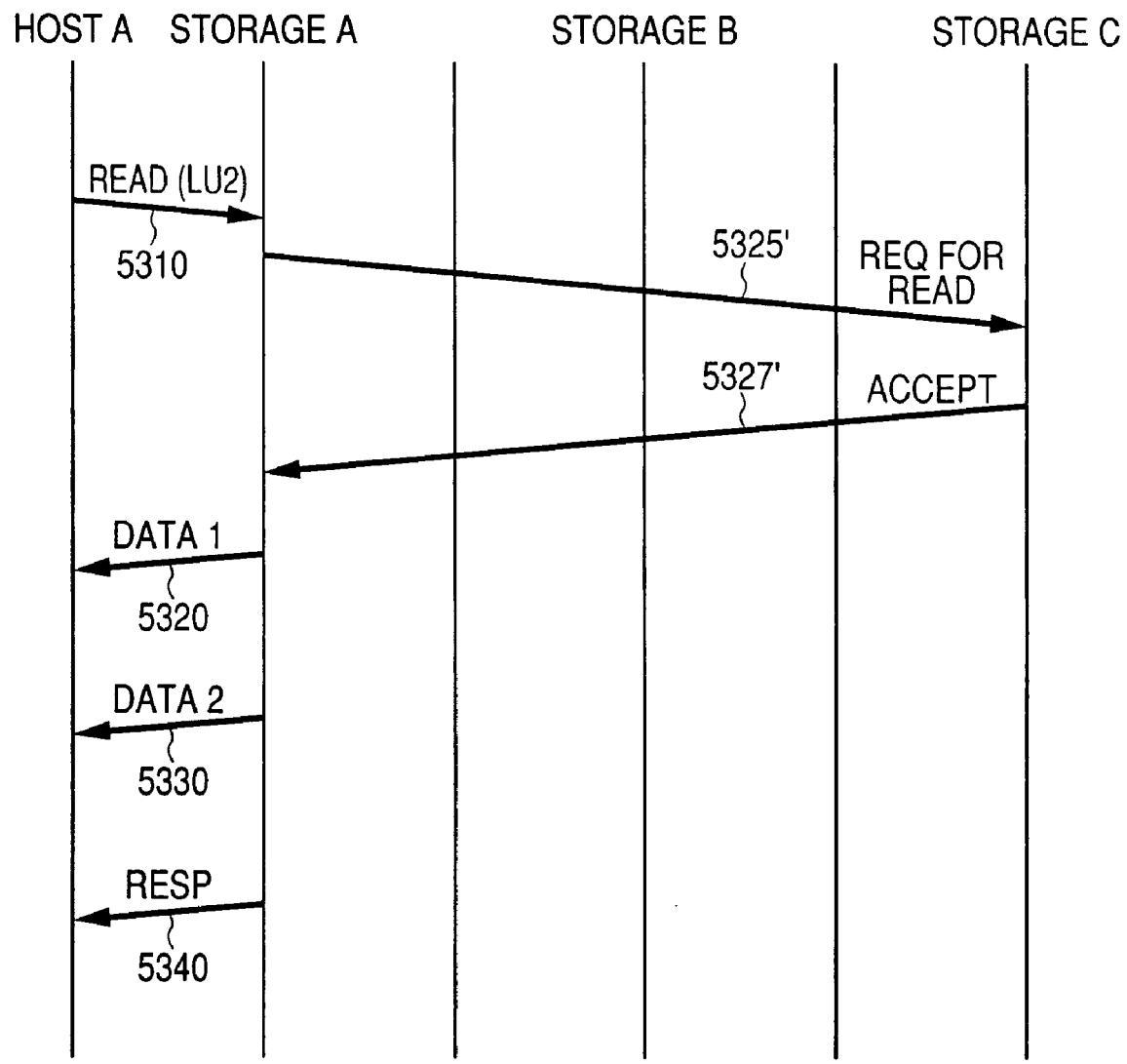
FIG. 20 is a diagram showing communication between respective sites when a storage apparatus structuring the storage system according to a fourth embodiment of the present invention receives a read request from the host.

Next, with reference to FIG. 20, a storage system representing a fourth embodiment will be described.

Lock conditions for an access request according to the above-described respective embodiments are as follows:
(1) The read processing and the write processing are not available for the storage area upon performing the write request processing, and
(2) The write processing is not available for the storage area upon performing the read request processing.

On the contrary, a lock condition for the access request according to the present embodiment involves only the condition (1) in which the read processing and the write processing are not available for the storage area upon performing write request processing, and the above-described condition (2) is not applied.

Therefore, in the lock information table 118Y according to the present embodiment, there is only the lock information table for writing 118d shown in FIG. 5, and there are no lock information tables for reading 118a to 118c.

Here, the specific operation of the storage system under the above-described lock conditions will be described with reference to FIG. 20. The example shown in FIG. 20 generally corresponds to the above-described example shown in FIG. 17, and it represents the communication that is carried out between respective sites when the read request to the area in the LU2 of which the owner is the storage apparatus 100C of the other site is issued to the storage apparatus 100A of the same site from the host 200A.

If the first I/F 110X of the storage apparatus 100A receives a read request from the host 200A (step 5310), at first, with reference to the owner information table 117Y, the storage apparatus 100A recognizes that the owner of the LU2 indicated by this read request is the storage apparatus 100C. Then, the storage apparatus 100A may transmit the read processing checking request to the storage apparatus 100C as the owner so as to check whether the storage apparatus 100C can perform the read processing (not upon performing the write processing) or whether it cannot perform the read processing (upon performing the write processing) (step 5325').

With reference to an information table 118d for writing 118d, the storage apparatus 100C as an owner judges whether the object area is locked, namely, it judges whether or not any of the storage apparatuses 100A, 100B and 100C is in write processing for the read processing confirmation requirement, and when none of them is in write processing, the reception response is returned to the storage apparatus 100A (step 5327').

Receiving the acceptance response, the storage apparatus 100A may read the data that is stored in the target area from the cache memory 112X of its own device or the disk device 101 to transmit it to the host 200A (steps 5320, 5330). After that, the storage apparatus 100A may transmit the normal termination response for the read request to the host 200A (step 5340).

In the meantime, according to the present embodiment, in contrast to the above-described respective embodiments, the respective storage apparatuses do no have a lock information table for reading, so that, even if the storage apparatus 100 as the owner receives a read processing checking request (step 5325'), respective storage apparatuses do not lock the target area for reading. Therefore, the storage apparatus 100A does not transmit the lock release request for reading to the storage apparatus 100C as the owner after the read processing.

According to the present embodiment, the processing which is carried out when receiving the write request from the host 200 is identical with the processing of the above-described embodiments, except that the storage apparatus 100 as the owner only refers to the lock information table for writing 118d.

As described above, according to the present embodiment, it is possible to reduce a resource to store the lock information, and, further, it is possible to omit the check processing of the lock information for reading.

A Fifth Embodiment

Next, a storage system according to the fifth embodiment of the present invention will be described below.

Similar to the fourth embodiment, the storage apparatus 100 according to the present embodiment may omit management of the lock information with regard to the read processing and may check them, and it has no lock information table for writing 118d. However, the lock condition to the access request of the present embodiment is:
(1') Only the write processing is not available for the storage area upon performing the write request processing.

And, the following restrictions are not applied in this embodiment:
(1") The read processing is not available for the storage area upon performing the write request processing.
(2) There is no access restriction such that the write processing is not available for the storage area upon performing the read request processing.

According to the present embodiment, similar to the case in which the conventional storage apparatus processes the read request, for a read request from the host 200, reading the data stored in the target area from the cache memory 112x of its own device or the disk device 101, the storage apparatus 100 may transmit the data to the host 200 and transmit the normal termination response thereto. In other words, according to the present embodiment, read processing is carried out in the storage apparatus as the owner of the area indicated by the read request without checking whether this target area is locked or not.

Accordingly, according to the present embodiment, it is possible to largely reduce the processing time of the read request for the host 200.

In the meantime, according to the present embodiment, the processing which is carried out when receiving a write request from the host 200 is identical with that of the fourth embodiment.

What is claimed is:

1. A storage apparatus, comprising:
   a host side communication part adapted to enable communication with a a storage side communication part adapted to enable communication with at least one other storage apparatus;
   a storage device to store data, where the storage device is divided into a plurality of logical unit (LU) storage areas, and where ones of the LU storage areas are further sub-divided into LU storage sub-areas;
   an owner information table to store ownership information indicating which storage apparatus manages each LU storage area;
   a lock information table to store lock information indicating whether or not write processing is restricted for each of plural LU sub-areas of said storage device; and
   a controller adapted to control the communication of said host side communication part and said storage side communication part and adapted to perform access processing for said storage device, while referring to said owner information table and said lock information table;
   wherein said controller controls said storage device to store a same data as the at least one other storage apparatus by making said storage side communication part to transmit and receive the data to and from the at least one other storage apparatus, and
   wherein, for access requests for a LU storage sub-area owned by said storage apparatus, said controller performs a lock reservation request receiving step for receiving a lock reservation request to restrict the write processing for any LU storage sub-area among said plural LU storage sub-areas from said at least one other storage apparatus by means of said storage side communication part; and
   lock reservation request processing step, upon receiving said lock reservation request in said lock reservation request receiving step:
   judging whether or not the write processing for the LU storage sub-area indicated by said lock reservation request is restricted with reference to said lock information table;
   transmitting rejection of the lock reservation to said at least one other storage apparatus by means of said storage side communication part when the write processing is restricted; and
   setting a write processing restriction in a field of said lock information table when the write processing is not restricted, and transmitting acceptance of the lock reservation to said at least one other storage apparatus by means of said storage side communication part;
   said controller then performs:
   an access request receiving step for receiving a write request to any LU storage sub-area by means of said host side communication part; and
   an owner access processing step, upon receiving said write request in said access request receiving step, performs:
   judging whether or not the write processing for the LU storage sub-area indicated by said write request is restricted with reference to said lock information table;
   not performing the write processing for said LU storage sub-area when the write processing is restricted;
   setting a write processing restriction in a field corresponding to said LU storage sub-area of said lock information table and performing the write processing for said LU storage sub-area when the write processing is not restricted; and
   a remote copy processing step for transmitting write data with respect to said write request to all other storage apparatuses by means of said storage side communication part when performing the write processing for said LU storage sub-area that is indicated by said write request in said owner access processing step;
   wherein, in said access request receiving step, said host side communication part receives a read request for any one of said plural LU storage sub-areas; and in said owner access processing step, said host side communication part performs read processing for said LU storage sub-area indicated by said read request without reference to said lock information table and transmits the data acquired as a result of said read processing.

2. A storage apparatus according to claim 1,
   wherein said storage device has a collection of plural LU storage sub-areas related as a storage area group, managed by said lock information table; and
   said storage device is provided with the owner information table indicating by which storage apparatus the lock information table for each storage area group of said storage device is managed;
   wherein said controller performs an owner judgment processing step for judging said write request received in said access request receiving step is the write processing for the LU storage sub-area included in which storage area group with reference to said owner information table;

if the write processing corresponds to the LU storage sub-area included in a storage area group of said lock information table that is managed by its own site, performing said owner access processing step; and if the write processing corresponds to the LU storage sub-area included in the storage area group of said lock information table that is managed by another storage apparatus, making said storage apparatus side communication part to transmit the lock reservation request to restrict the write request for the LU storage sub-area included in said storage area group to said other storage apparatus managing the lock information of said storage apparatus side communication part;

non-owner access processing step for performing the write processing for said LU storage sub-area that is indicated by said write request when said storage side communication part receives acceptance of a lock reservation for said lock reservation request after transmitting said lock reservation request in said owner judgment processing step; and lock release request transmitting step for making said storage apparatus side communication part to transmit a lock release request to release an access restriction for said LU storage sub-area to said other storage apparatus after performing the write processing for said LU storage sub-area in said non-owner access processing step.

3. A storage apparatus according to claim 2, wherein said controller performs a remote copy processing step for transmitting write data with respect to said write request to all other storage apparatuses by means of said storage side communication part, when performing the write processing for said LU storage sub-area that is indicated by said write request in said non-owner access processing step.

4. A storage apparatus according to claim 3, wherein said controller receives the read request for any one of said plural LU storage sub-areas by means of said host side communication part in said access request receiving step; and when judging that said read request is a read processing for the LU storage sub-area that is included in the storage area group of said lock information table that is managed by its own site in said owner judgment processing step, said controller performs the read processing for said LU storage sub-area that is indicated by said read request without reference to said lock information table and transmits the data acquired as a result of said read processing in said owner access processing step; and said controller receives the read request for any one of said plural LU storage sub-areas by means of said host side communication part in said access request receiving step; and when judging that said read request is read processing for the LU storage sub-area that is included in the storage area group of said lock information table that is managed by the storage apparatus of another site in said owner judgment processing step, said controller performs the read processing for said LU storage sub-area that is indicated by said read request without transmitting said lock reservation request to the storage apparatus of said other site, and transmits data acquired as a result of said read processing in said owner access processing step.

5. A computer-readable storage medium having a program embedded therein for operating a storage apparatus, wherein said storage apparatus comprises:

a storage device, where the storage device is divided into a plurality of logical unit (LU) storage areas, and where ones of the LU storage areas are further sub-divided into a plural LU storage sub-areas;

a host side communication part adapted to enable communication with a host;

a storage side communication part adapted to enable communication with at least one other storage apparatus; and a controller adapted to control communication of said host side communication part and said storage side communication part, and adapted to enable access processing for said storage device; and said controller controls plural storage apparatuses to store a same data therein by transmitting and receiving the data stored in said storage device to and from said at least one other storage apparatus;

said program comprising:

ownership determining code referring to an owner information table used to store ownership information indicating which storage apparatus manages each LU storage area;

lock reservation request receiving code that receives a lock reservation request to restrict write processing for any LU storage sub-area among said plural LU storage sub-areas of said storage device, from said at least one other storage apparatus by means of said storage side communication part; and lock reservation request processing code that, upon receiving said lock reservation request for a LU storage sub-area that is not owned by said storage apparatus:

judges whether or not the write processing for the LU storage sub-area indicated by said lock reservation request is restricted by referencing a lock information table storing lock information indicating whether or not the write processing for said LU storage sub-area is restricted for each of plural LU storage sub-areas of said storage device;

transmits rejection of the lock reservation request to said at least one other storage apparatus by means of said storage side communication part when the write processing is restricted; and sets the write processing restriction in the field corresponding to said LU storage sub-area of said lock information table when the write processing is not restricted, and transmits acceptance of the lock reservation request to said other storage apparatus by means of said storage side communication part;

access request receiving code that receives a write request for any one of said plural LU storage sub-areas by means of said host side communication part;

owner access processing code that, upon receiving said write request:

judges whether or not write processing for the LU storage sub-area indicated by said write request is restricted with reference to said lock information table by means of said controller, does not perform the write processing for said LU storage sub-area when the write processing is restricted; and sets the write processing restriction in a field corresponding to said LU storage sub-area of said lock information table and performs the write processing for said LU storage sub-area, when the write processing is not restricted;

wherein said owner access processing code performs a remote copy processing step for transmitting write data with respect to said write request to all other storage apparatuses by means of said storage side communication part, when said controller performs the write processing for said LU storage sub-area that is indicated by said write request;

wherein said controller receives a read request for any one of said plural LU storage sub-areas by means of said host side communication part in said access request receiving step; and when judging that said read request is read processing for the LU storage sub-area that is included in a storage area group of said lock information table that is managed by its own site in said owner judgment processing step, said controller performs the read processing for said LU storage sub-area that is indicated by said read request without reference to said lock information table and transmits data acquired as a result of said read processing in said owner access processing step.

6. A computer-readable storage medium according to claim 5, wherein said storage device has a collection of plural LU storage sub-areas related as a storage area group, managed by said lock information table;

wherein said program product comprising:

owner judgment processing code that:

judges whether said write request received in said access request receiving step is the write processing for the LU storage sub-area included in which storage area group with reference to the owner information table indicating by which storage apparatus a lock information table for each storage area group of said storage device is managed;

if the write processing corresponds to the LU storage sub-area included in the storage area group of said lock information table that is managed by its own site, performs said owner access processing step; and if the write processing corresponds to the LU storage sub-area included in the storage area group of said lock information table that is managed by another storage apparatus, makes said storage apparatus side communication part to transmit the lock reservation request to restrict the write request for the LU storage sub-area included in said storage area group to said other storage apparatus managing the lock information of said storage apparatus side communication part;

non-owner access processing code that performs the write processing for said LU storage sub-area that is indicated by said write request when said storage side communication part receives acceptance of a lock reservation for said lock reservation request after transmitting said lock reservation request in said owner judgment processing step; and lock release request transmitting code that makes said storage apparatus side communication part to transmit a lock release request to release an access restriction for said LU storage sub-area to said other storage apparatus, after performing the write processing for said LU storage sub-area by said non-owner access processing code.

* * * * *